(12) United States Patent  
White et al.

(10) Patent No.: US 10,371,504 B2  
(45) Date of Patent: Aug. 6, 2019

(54) LIGHT FIXTURE COMMISSIONING USING DEPTH SENSING DEVICE

(71) Applicant: ABL IP HOLDING LLC, Conyers, GA (US)

(72) Inventors: Sean P. White, Reston, VA (US); Daniel M. Megginson, Fairfax, VA (US); Jenish S. Kastee, South Riding, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 118 days.

(21) Appl. No.: 15/720,633

(22) Filed: Sep. 29, 2017

(65) Prior Publication Data

US 2019/0101377 A1    Apr. 4, 2019

(51) Int. Cl.
| | |
|---|---|
| G01B 11/14 | (2006.01) |
| G01C 15/00 | (2006.01) |
| G01B 11/26 | (2006.01) |
| H04N 5/33 | (2006.01) |
| G01P 15/00 | (2006.01) |
| G06T 7/00 | (2017.01) |

(52) U.S. Cl.
CPC ............. *G01B 11/14* (2013.01); *G01B 11/26* (2013.01); *G01C 15/002* (2013.01); *G01P 15/00* (2013.01); *G06T 7/00* (2013.01); *H04N 5/33* (2013.01)

(58) Field of Classification Search
CPC ...... G01B 11/14; G01B 11/26; G01C 15/002; G01P 15/00; G06T 7/00; H04N 5/33
See application file for complete search history.

(56) References Cited

U.S. PATENT DOCUMENTS

| 8,913,037 | B1* | 12/2014 | Liu ...................... G06F 3/0425 345/175 |
| 10,034,314 | B2* | 7/2018 | White ................ H05B 37/0272 |
| 10,072,934 | B2* | 9/2018 | White .................. G01C 21/206 |
| 2013/0141554 | A1* | 6/2013 | Ganick ..................... G01S 1/70 348/61 |

(Continued)

OTHER PUBLICATIONS

U.S. Appl. No. 15/467,333, filed Mar. 23, 2017, entitled "Simultaneous Display and Lighting", 44 pages.

(Continued)

*Primary Examiner* — Oschta I Montoya  
(74) *Attorney, Agent, or Firm* — RatnerPrestia

(57) ABSTRACT

A system includes a depth sensing device that includes a depth sensor. The depth sensor includes an infrared projector and an infrared camera. The system includes a processor coupled to the depth sensor and a memory accessible to the processor, and programming in the memory. Execution of the programming by the processor configures the system to perform functions, including functions to project, via the infrared projector, a pattern of infrared light on a plurality of objects located in a space that are reached by the projected infrared light. The plurality of objects includes objects of interest and light fixtures in the space. The execution of the programming by the processor further configures the system to determine light fixture location coordinates for each of the light fixtures based on computed distances between the objects of interest and each of the light fixtures based on distortions of the projected infrared light.

21 Claims, 16 Drawing Sheets

(56) References Cited

U.S. PATENT DOCUMENTS

2017/0059151 A1 3/2017 Black et al.
2017/0061904 A1 3/2017 Lin et al.
2017/0292681 A1 10/2017 Lin et al.
2018/0005590 A1 1/2018 Komanduri et al.
2018/0076891 A1* 3/2018 Agrawal .............. H04B 10/116

OTHER PUBLICATIONS

U.S. Appl. No. 15/357,143, filed Nov. 21, 2016, entitled "Interlaced Data Architecture for a Software Configurable Luminaire", 44 pages.
U.S. Appl. No. 15/468,626, filed Mar. 24, 2017, entitled "Simultaneous Wide Lighting Distribution and Display", 51 pages.
U.S. Appl. No. 15/467,333, filed Mar. 23, 2017, entitled "Protecting Your Invention Outside the United States", 44 pages.
U.S. Appl. No. 15/211,272, filed Jul. 15, 2016, entitled "Multi-Processor System and Operations to Drive Display and Lighting Functions of a Software Configurable Luminaire", 46 pages.
U.S. Appl. No. 15/424,208, filed Feb. 3, 2017, entitled "Luminaire and Lighting System, Combining Transparent Lighting Device and Display Coupled to Output Image via the Transparent Lighting Device", 52 pages.

* cited by examiner

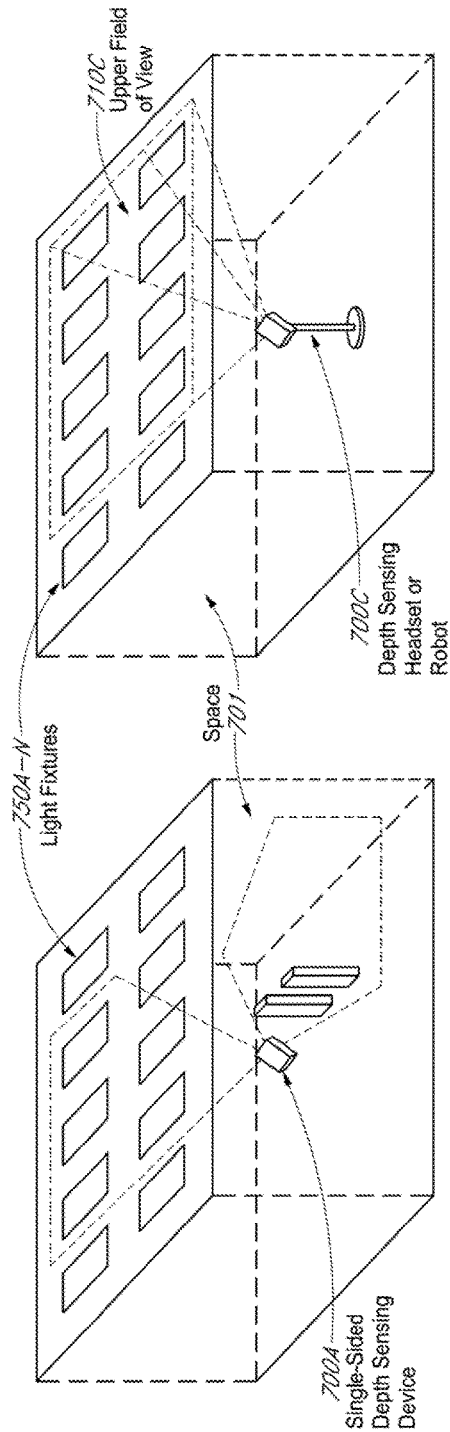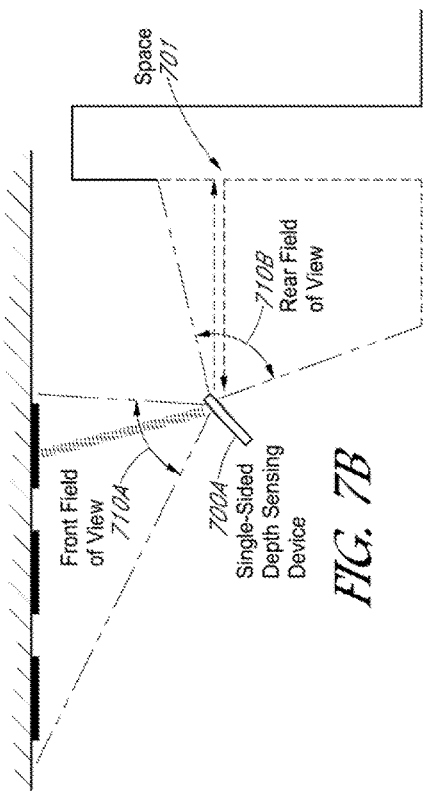

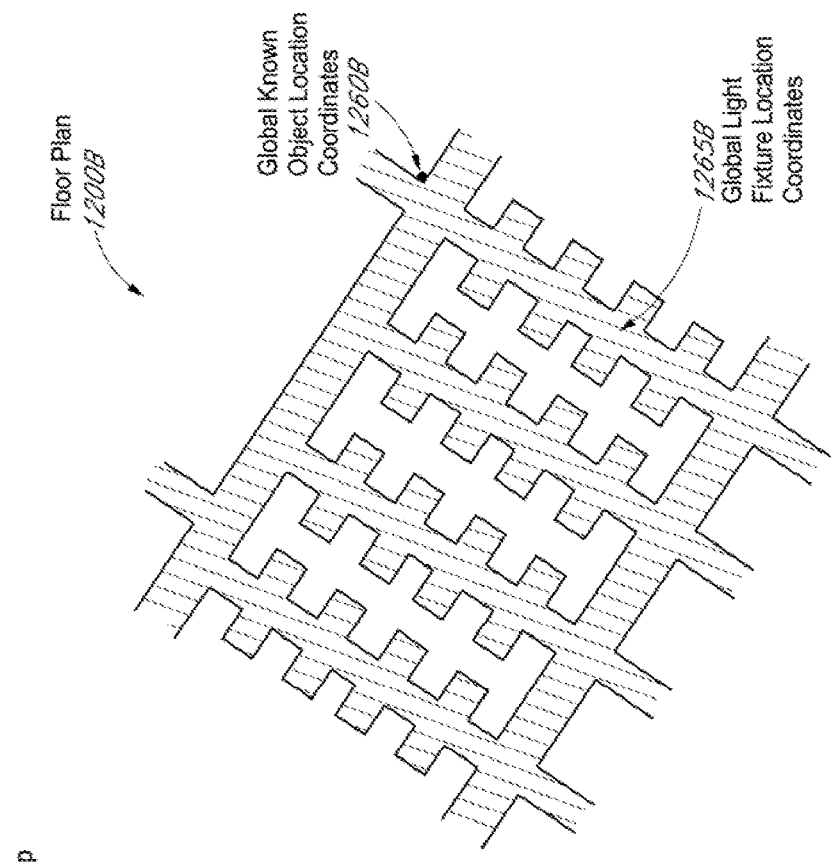
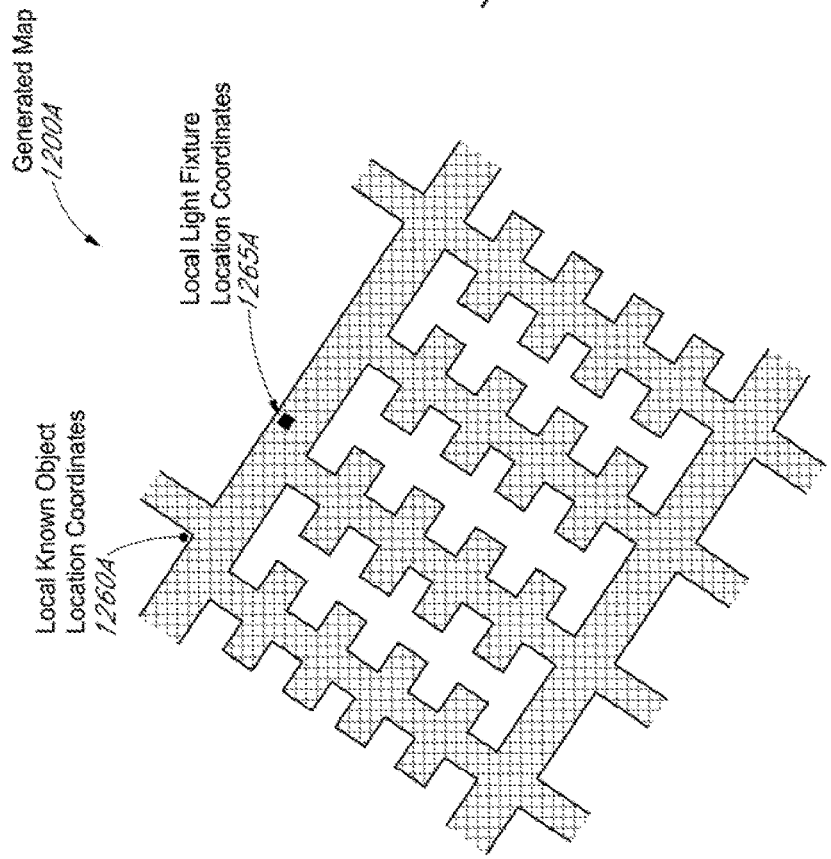
FIG. 12B
FIG. 12A

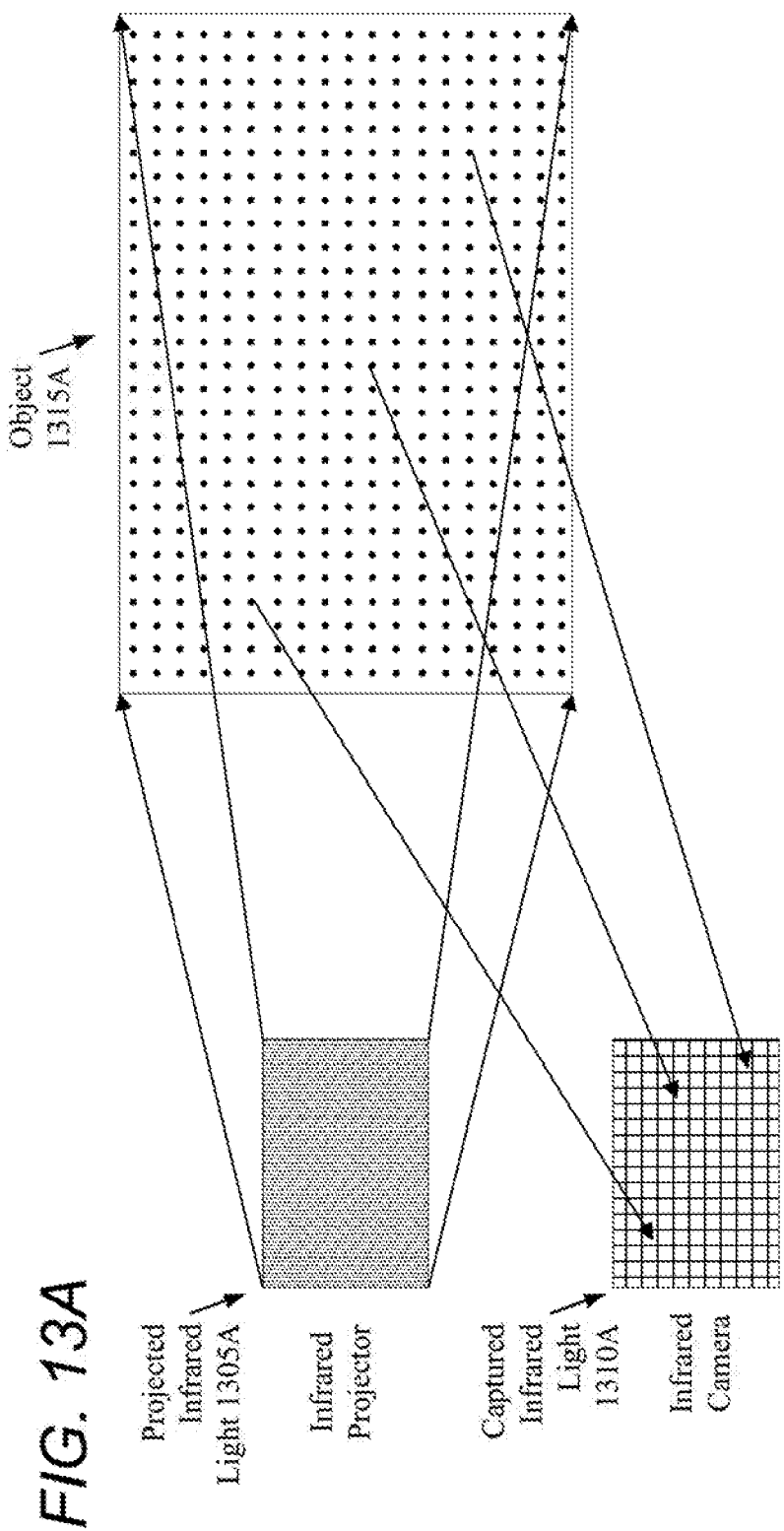

LIGHT FIXTURE COMMISSIONING USING DEPTH SENSING DEVICE

TECHNICAL FIELD

The present subject matter relates to lighting systems that may include light fixtures, controllers, sensors, and networking thereof. More specifically, techniques and depth sensing devices for commissioning a system of light fixtures are described herein.

BACKGROUND

Electrical lighting has become commonplace in modern society. Electrical lighting devices are commonly deployed, for example, in homes, buildings or commercial and other enterprise establishments, as well as in various outdoor settings. Even in a relatively small state or country, there may be millions of lighting devices in use.

Traditional light fixtures, such as light fixtures (i.e., luminaires), have tended to be relatively dumb, in that they can be turned ON and OFF, and in some cases may be dimmed, usually in response to user activation of a relatively simple input device. Light fixtures have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional light fixtures are controlled individually or as relatively small groups at separate locations.

With the advent of modern electronics has come advancement, including advances in the types of light sources as well as advancements in networking and control capabilities of the light fixtures. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the light fixtures, it becomes relatively easy to incorporate associated communications capabilities, e.g. to allow lighting devices to communicate with system control elements and/or with each other. In this way, advanced electronics in the light fixtures as well as the associated control elements have facilitated more sophisticated lighting control algorithms as well as increased networking of light fixtures.

However, deployment of substantial numbers of light fixtures with associated controllers and/or sensors and networking thereof presents increasing challenges for set-up and management of the lighting system elements and network communication elements of the lighting system. Commissioning the lighting system to create a physical or logical networking map of the space in a room, building, etc. where the light fixtures are installed is a manual process. Installers (i.e., human beings) will often take hours or multiple days to coordinate where light fixtures are coordinated in relation to a map of the space and the applications for which the light fixtures are being controlled, such as for visual light source based positioning system or networked space lighting system. As a result of the manual mapping process, mistakes are often made and installation becomes more of an iterative process for installers rather than "one and done."

SUMMARY

In an example, a system includes a depth sensing device including a depth sensor. The depth sensor includes an infrared projector and an infrared camera. The system may further include a processor coupled to the depth sensor and a memory accessible to the processor, and programming in the memory. Execution of the programming by the processor configures the system to perform functions, including functions to project, via the infrared projector, a pattern of infrared light on a plurality of objects located in a space that are reached by the projected infrared light. The plurality of objects includes objects of interest and light fixtures in the space. The execution of the programming by the processor further configures the system to capture, via the infrared camera, distortions of the pattern in the projected infrared light on the plurality of objects and uniquely identify each of the light fixtures in the space. The execution of the programming by the processor further configures the system to compute distance between the objects of interest and each of the uniquely identified light fixtures in the space based on the distortions. The execution of the programming by the processor further configures the system to determine light fixture location coordinates for each of the light fixtures based on the computed distances between the objects of interest and each of the light fixtures. The execution of the programming by the processor further configures the system to build a map of the space that includes the determined light fixture location coordinates for each of the light fixtures.

In an example, a system includes a depth sensing device including a depth sensor. The depth sensor includes an emitter and a detector. The depth sensing device further includes a processor coupled to the depth sensor, a memory accessible to the processor, and programming in the memory. Execution of the programming by the processor configures the system to perform functions, including functions to emit, via the emitter, a pattern of electromagnetic waves on a plurality of objects located in a space that are reached by the emitted electromagnetic waves. The plurality of objects include objects of interest and light fixtures in the space. The execution of the programming by the processor further configures the system to capture, via the detector, distortions of the pattern in the electromagnetic waves on the plurality of objects and uniquely identify each of the light fixtures in the space. The execution of the programming by the processor further configures the system to compute distance between the objects of interest and each of the uniquely identified light fixtures in the space based on the distortions. The execution of the programming by the processor further configures the system to determine light fixture location coordinates for each of the light fixtures based on the computed distances between the objects of interest and each of the light fixtures. The execution of the programming by the processor further configures the system to build a map of the space that includes the determined light fixture location coordinates for each of the light fixtures.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIGS. 7A-B depict a single-sided depth sensing device with a first field of view for a depth sensor and a second field for a camera receiving a visual light communication (VLC) code from a light fixture.

FIG. 7C depicts a depth sensing headset or autonomous vehicle carrying a depth sensing device with a single field of view.

FIG. 12A depicts a simultaneous location and mapping (SLAM) algorithm generated map.

FIG. 12B depicts a building floor plan corresponding to the space for which the SLAM generated map of FIG. 12A was generated.

FIGS. 13A-B illustrate examples of infrared light patterns projected by an infrared projector of the depth sensor and infrared light captured by an infrared camera of the depth sensor.

DETAILED DESCRIPTION

Figure 1A:
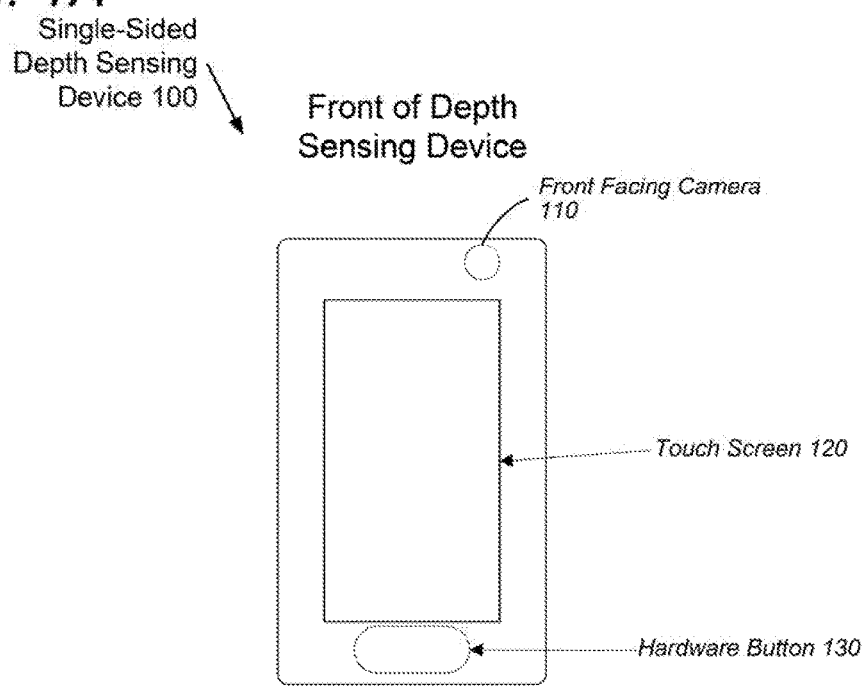
FIGS. 1A-B are front and rear views of an example of a hardware configuration of a depth sensing device for use in lighting system commissioning, which includes a depth sensor on one side.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Lighting systems, such as indoor visible light source based positioning systems deployed in commercial retail spaces, for example, allow a consumer to pinpoint consumer products within a store. Such visible light source based positioning systems typically require the exact location of the light fixtures to be determined and recorded during commissioning, to allow the user walking through the store with a mobile device to later know the user's position based on the location of one or more proximate light fixtures. For example, the mobile device being carried by the user captures a modulated visible light code from the proximate light fixture that uniquely identifies the proximate light fixture via a camera of the mobile device and can take other sensor measurements to calculate the position of the mobile device in the store space. Processing of the light fixture identifier(s) and known fixture location(s) enables estimation of the mobile device and thus the user holding/operating the mobile device. In such a system, accurate estimation of mobile device location is dependent upon accurate information about light fixture location(s).

Locating the light fixtures in the space as part of the commissioning of such an indoor visible light source based positioning system and/or other networked lighting system is often time consuming and error prone because human beings are involved. In some cases, finding an exact location of a light fixture is a very manual and labor intensive process. Locating fixtures via a conventional camera is inaccurate due to estimations on light fixture layouts and room or building layouts. Self-commissioning is an option, but requires additional hardware to be included in the light fixtures, increasing cost.

The examples in the drawings and described below relate to depth sensing devices and methods using such devices to create a virtual map of a physical installation of light fixtures within a space of a room, building, etc. using one or more depth sensors included in a depth sensing device. Depth sensing devices, such as structured-light 3D scanners, provide a third dimension to cameras. Utilizing the depth sensing devices and techniques described herein can cut down on installation time as well as require less effort and knowledge on the part of installers.

In one example, a 3-D depth sensing camera of a depth sensing device is used to automatically generate a virtual map of various light fixtures installed in a physical space. The virtual map generated by the depth sensing device can provide better accuracy than manual mapping techniques and reduce installation time. The depth sensing devices and procedures can utilize currently available computing platforms for depth technologies, including Google Tango® or Microsoft Kinect®.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

Figure 1B:
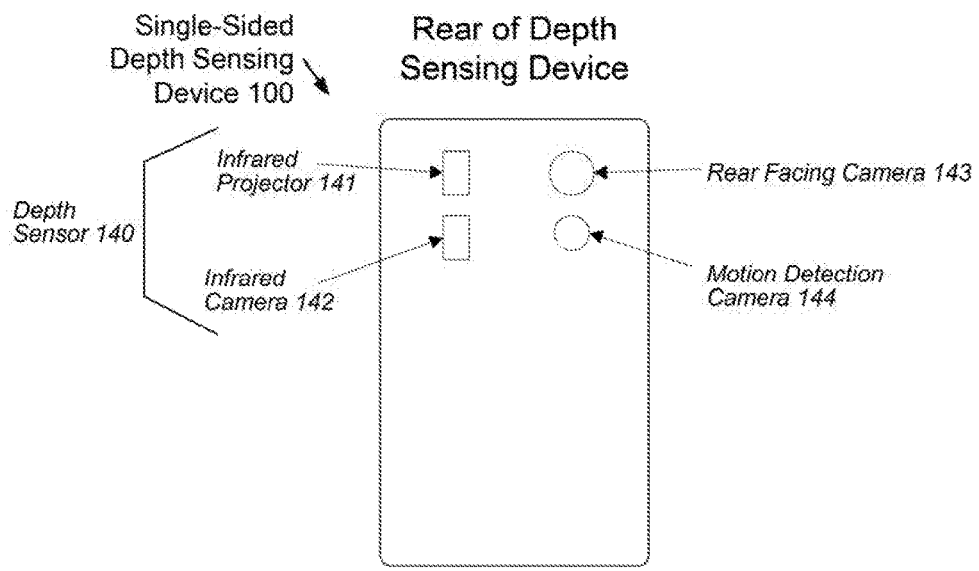

FIGS. 1A-B illustrate an example configuration of a depth sensing device, which includes a depth sensor one side, in simplified block diagram form. As shown in FIG. 1A, the depth sensing device, which is a single-sided depth sensing device 100 in the example, includes a front facing camera 110, a touch screen 120, and a hardware button 130 located on a front side. As further shown in FIG. 1B, the single-sided depth sensing device 100, includes a depth sensor 140, a rear facing camera 143, and a motion detection camera 144 located on a rear side of the device 100. In some examples, the depth sensor 140 may be located on the front side of the depth sensing device 100 instead of the rear side of the device, or other sides of the device.

The depth sensing device 100 may be implemented by enhancing a mobile device (e.g. a smartphone or tablet) by the addition of the depth sensor 140. For such an implementation of device 100, the depth sensor 140 may be integrated into a modified mobile device or added to a mobile device as an accessory (e.g. as part of a cover or case for the mobile device with suitable connections via a data port of the mobile device).

Figure 13B:
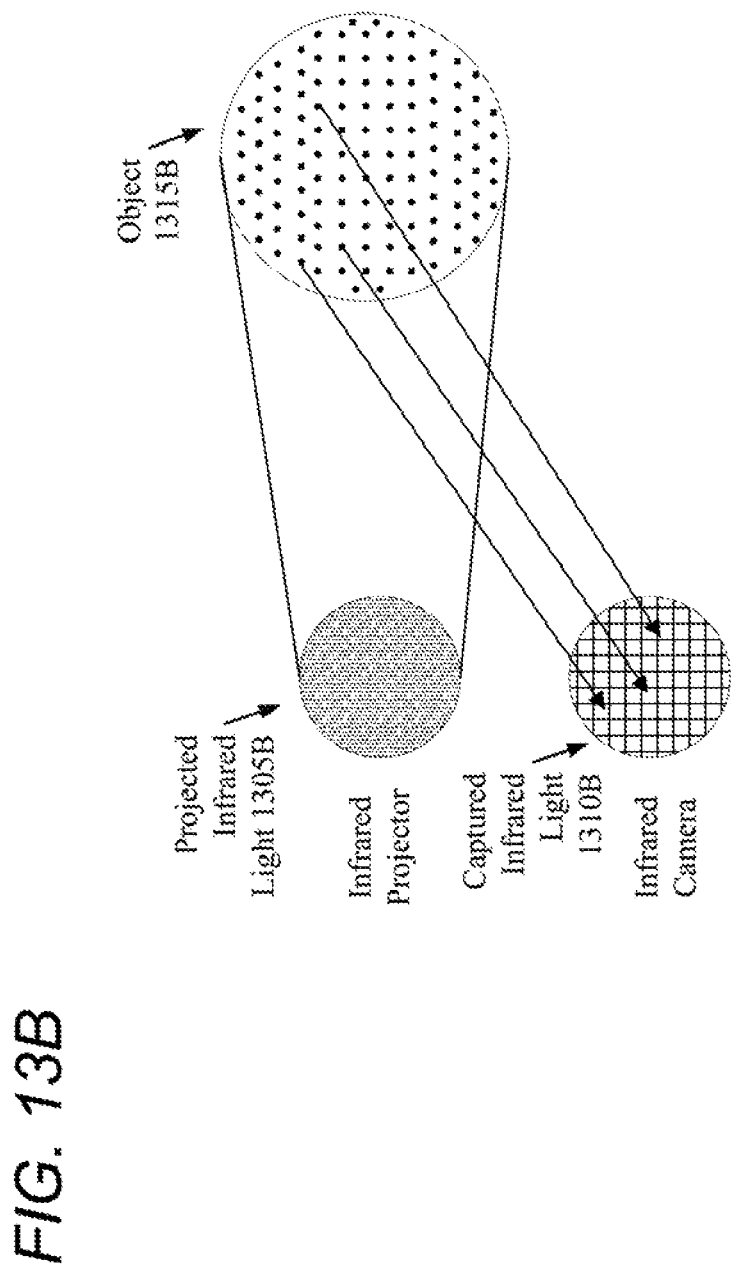

The depth sensor 140 in the example includes an infrared projector 141 to project a pattern of infrared light and an infrared camera 142 to capture images of distortions of the projected infrared light by objects in a space. The infrared projector 141, for example, may blast infrared light which falls on objects within the space like a sea of dots. In some examples, the infrared light is projected as a line pattern, a spiral, or a pattern of concentric rings or the like. Infrared light is typically not visible to the human eye. The infrared camera 142 is similar to a standard red, green, and blue (RGB) camera but receives and captures images of light in the infrared wavelength range. For depth sensing, the infrared camera 142 is coupled to an image processor that judges time of flight based on the captured image of the infrared light. For example, the distorted dot pattern in the captured image can then be processed by an image processor to determine depth from the displacement of dots. Typically, nearby objects have a pattern with dots spread further apart and far away objects have a denser dot pattern. Examples of infrared light patterns projected by the infrared projector 141 and infrared light captured by the infrared camera 142 are shown in FIGS. 13A-B. Alternatively or additionally, the depth sensor 140 may include an emitter, such as a projector, that projects a pattern of ultraviolet, visible light (e.g., using different colors), or other light wavelengths and the depth sensor 140 further includes a detector, such as a camera, that receives and captures images of light in the ultraviolet, visible light (e.g., using different colors), or other wavelengths for detecting depth of objects using a coupled processor to determine time of flight based on the captured image of the light, for example. Alternatively or additionally, the depth sensor 140 may include an emitter that emits electromagnetic waves, such as radio waves (radio directing and ranging—RADAR), and the depth sensor 140 further includes a detector that receives and captures the electromagnetic waves, such as the radio waves, for detecting depth of objects using a coupled processor to determine time of flight based on the captured electromagnetic waves (e.g., radio waves), for example. Alternatively or additionally, the depth sensor 140 may include an emitter that emits pulsed laser light (LIDAR) and the depth sensor 140 further includes a detector that receives and captures the laser light for detecting depth of objects using a coupled processor to determine time of flight based on the captured laser light, for example.

In other examples, currently available devices, such as the Microsoft Kinect®, Microsoft Hololens®, and Google Tango® can be used which have alternative sensing modules to measure depth that include infrared and additional black and white cameras to handle depth sensing. The Google Tango® smart device is similar to the single-sided depth sensing device 100 of FIGS. 1A-B and has a standard camera and a depth sensor on the back as shown in FIGS. 1A-B.

In another example, devices like the Apple iPhone® 7 can be used to measure depth which includes a dual camera setup to achieve similar results, without using a depth sensor 140. The Apple iPhone® 7 measures depth by changing focus and uses a varying level of focal lengths between dual cameras. When an object comes into focus as the focal lengths are run through, the distance of the object can be calculated based on the focal length that enabled the object to come into focus.

The depth sensing device 100 allows a user, such as a light fixture installer, to compute a near exact distance away from the objects. The depth sensor 140 provides a view in a third dimension to the depth sensing device 100. Executable software implemented on the depth sensing device 100 allows objects in a space to be scanned for their depth based on the infrared images captured by the depth sensor and image recognition and object detection software enables the scanned objects to be identified. Location coordinates of objects (e.g., light fixtures) within the space can then be determined based on the actual measured distance to three other scanned objects and the known location coordinates of the three other scanned objects, for example, instead of a planned estimated distance specified ahead of time in a building floor plan which can be inaccurate due to unplanned obstructions (e.g., ductwork).

The front facing camera 110 may be used to uniquely identify light fixtures. In one example, the front facing camera 110 receives a visual light communication (VLC) rolling code from a light fixture. Alternatively, the front facing camera 110 may receive a quick response (QR) code from the light fixture. The QR code can be a static code that is painted on the light fixture that reflects a wavelength of light being emitted by the infrared projector 141 and the infrared camera 142 sees high reflectivity off of the static QR code. For example, phosphor can reflect infrared, ultraviolet, or standard light to match the depth sensing features. In the example, the phosphor fluoresces in the infrared space and is picked up by the infrared camera 142. Alternatively, if the paint is non-reflective within the infrared space, the absence of such reflectively can also be used to uniquely identify the light fixture.

The QR code be a dynamic code that is outputted by changing the pixel or LED output of a display component of the light fixture, where the light fixture is a dual illumination and display type lighting device. Examples of a luminaire that includes such general illumination light sources and transparent displays which use light emission matrices to emit output light of images suitable for application in the light fixtures are disclosed in U.S. patent application Ser. No. 15/296,634, filed Oct. 18, 2016, entitled "Luminaire Utilizing Display Device and Associated Illumination Component(s);" U.S. patent application Ser. No. 15/244,402, filed Aug. 23, 2016, entitled "Enhancements for Use of a Display in a Software Configurable Lighting Device;" U.S. patent application Ser. No. 15/424,208, filed Feb. 3, 2017, entitled "Luminaire and Lighting System, Combining Transparent Lighting Device and Display Coupled to Output Image via the Transparent Lighting Device;" U.S. patent application Ser. No. 15/198,712, filed Jun. 30, 2016, entitled "Enhancements of a Transparent Display to Form a Software Configurable Luminaire," U.S. patent application Ser. No. 15/211,272, filed Jul. 15, 2016, entitled "Multi-Processor System and Operations to Drive Display and Lighting Functions of a Software Configurable Luminaire," U.S. patent application Ser. No. 15/467,333 filed Mar. 23, 2017, entitled "Simultaneous Display and Lighting;" U.S. patent application Ser. No. 15/468,626, filed Mar. 24, 2017 entitled "Simultaneous Wide Lighting Distribution and Display;" U.S. patent application Ser. No. 15/357,143, filed Nov. 21, 2016, entitled "Interlaced Data Architecture for a Software Configurable Luminaire," and U.S. patent application Ser. No. 15/095,192, filed Apr. 11, 2016, entitled "Luminaire Utilizing a Transparent Organic Light Emitting Device Display," the entire contents all of which are incorporated herein by reference. These incorporated applications also disclose a variety of implementations of a general illumination light source including a second light emission matrix co-located the with an emission matrix of a transparent display.

In another example, the depth sensing device 100 may receive a light fixture identifier via a wireless communication interface from the light fixture. Once the light fixture is uniquely identified, the depth sensing device 100 determines location coordinates of the light fixture by correlating the location coordinates to objects of interest in the space, including known objects whose location coordinates are known and depth sensed distances between the known objects to the light fixture, whether at floor level or also co-located (e.g., near or at the ceiling level), to build a map of the space. For example, a grocery store aisle may include several objects of interest, such a cereal boxes, cereal bars, and an aisle sign, but only the aisle sign is a known object with known location coordinates; whereas, the boxes of cereal and cereal bars are just regular objects of interest.

In a first configuration, the infrared projector 141 of the depth sensor 140 on the rear side of the single-sided depth sensing device 100 is pointed at objects in a rear field of view on the ground level of the space, including a known object, such as an aisle sign in a store stating the aisle number (e.g., 25) and listing items (e.g., toilet paper) in that store aisle. Infrared light is projected onto the objects within the space (e.g., aisle sign) by the infrared projector 141, and the infrared camera 142 captures and records images of the rear field of view with the distortions of the patterns of projected infrared light by the objects. At the same time, the front facing camera 110, such as an RGB camera, on the front side of the depth sensing device 100 captures images of a front field of view with modulated visible light encoding visible light communication (VLC) identifiers to identify light fixtures that are proximate the objects seen in the rear field of view.

After capturing images of the distortions of the pattern of projected infrared light on the objects (e.g., aisle sign) in the rear field of view with the infrared camera 142 and identifying light fixtures proximate the objects in the front field of view with the front facing camera 110, the single-sided depth sensing device 100 may be rotated. This is because the depth sensor 140 is only located on a single side (rear side) of the single-sided depth sensing device 100 and the captured images in the rear field of view of the objects are only sufficient to determine the depth of the objects in the rear field of view. Hence, depth measurements are still needed for the light fixture identified and seen in the images captured of the front field of view by the front facing camera 110. Alternatively, the single-sided depth sensing device 100 may be positioned at an appropriate angle to have a light fixture and the aisle sign in the same field of view of the depth sensor 140 on the rear side of the device 100.

The location of light fixtures which have been uniquely identified can then be determined by correlating respective location coordinates in the space relative to the known object (e.g., aisle sign) and two other known objects, for example. Repeating this procedure through the space generates a map of the light fixtures relative to objects at the ground level of the space, some of which are important known objects whose location coordinates are known. The light fixtures can then have their location coordinates trilaterated relative to the objects. If the object is a known object whose location serves as a reference of known fixed GPS location coordinates, the light fixture distance can be calibrated based on the known location coordinates.

If the object is unknown, the process can be repeated until a known object location is found. In one example, the location coordinates of the unknown object may be trilaterated from the known object and two other objects. The location coordinates of the light fixture can then be trilaterated based on the unknown object (whose location coordinates are now known) and two other known objects. Relative coordinates of the unknown objects or light fixtures to the known object in 3 dimensions (X, Y, Z) can be mapped to a global known coordinate system on which the known object exists (e.g., has global coordinates) and then the relative coordinates of the unknown object can be transformed accordingly.

A simultaneous localization and mapping (SLAM) algorithm can be executed on the depth sensing device 100 or other computing device (e.g., a host computer) that acts in concert as part of the overall lighting system that renders a map of imperfect polygons and then solves the problem to determine distances of the light fixtures. Such a SLAM algorithm computes and updates a map of an unknown space while simultaneously keeping track of the location of the depth sensing device 100 within it, for example, utilizing Monte Carlo methods, such as a particle filter and/or an extended Kalman filter.

Figure 2A:
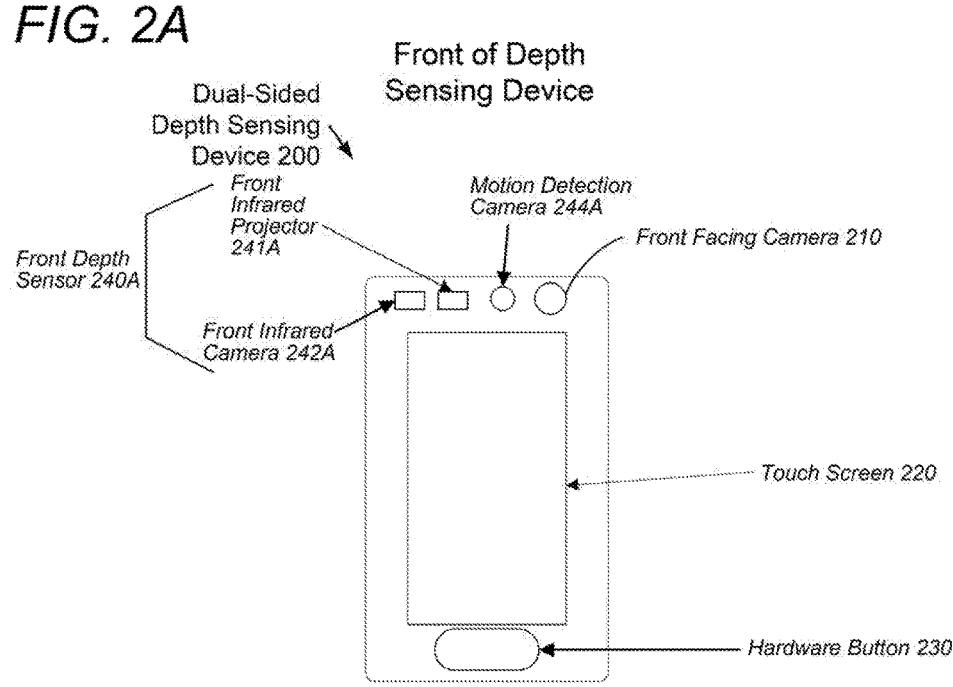
FIGS. 2A-B are front and rear views of an example of a hardware configuration of another depth sensing device, for use in lighting system commissioning, which includes a depth sensor on two sides.
Figure 2B:
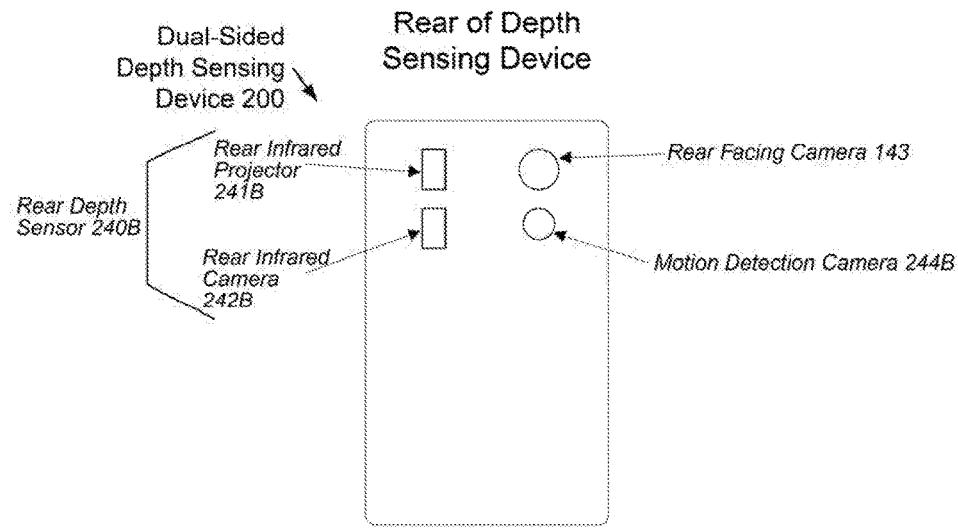

FIGS. 2A-B illustrate an example of a hardware configuration of another depth sensing device, which includes a depth sensor side on two sides, in simplified block diagram form. As shown in FIG. 2A, the depth sensing device, which is a dual-sided depth sensing device 200 in the example, includes a front facing camera 210, a touch screen 220, and a hardware button 230 located on a front side of the device 100. The front side of the dual-sided depth sensing device 200 also includes a front facing depth sensor 240A. As further shown in FIG. 2B, the dual-sided depth sensing device 100, includes a rear facing depth sensor 240B, a rear facing camera 243, and a motion detection camera 244 located on a rear side of the device 200. Each of the depth sensors 240A-B has a respective infrared projector 241A-B and an infrared camera 242A-B. Although described as front facing and rear facing, it should be understood that the orientation of the depth sensors 240A-B can be oriented on any sides of the depth sensing device (whether opposing or not), such that different fields of views can be captured.

In an example, the infrared cameras 241A-B project a pattern of infrared light simultaneously in two different fields of view, for example, a front field of view and a rear field of view. The infrared camera 242B of the rear depth sensor 240B captures images containing distortions of the projected infrared light by objects on the ground level, such as a known object and, at the same time, the infrared camera 242A of the front depth sensor 240B captures images containing distortions of the projected infrared light by light fixtures. The light fixtures can be identified simultaneously with the infrared light being projected by the infrared projectors 241A-B and captured by the infrared cameras 242A-B. By combining the simultaneously captured images, exact light fixture distances to the known object can be calculated by an image processor. For example, the known object (e.g., aisle sign listing toilet paper) is viewed in rear field of view by the rear infrared camera 242B at the same time as the light fixture that emits a VLC identifier is viewed in the front field of view by the front infrared camera 242B. The distances of the light fixture can be triangulation, for example, by forming a triangle with only one missing side. The angles are known from the known object orientation, light fixture orientation, and dual-sided depth sensing device 200 orientation.

The dual-sided depth sensing device 200 of the second configuration may be more accurate than the single-sided depth sensing device 100 of the first configuration because having depth sensors 240A-B on both sides removes some of the estimations needed for the first configuration to work. For example, the distance can be computed directly between multiple objects simultaneously using front depth sensor 240A and rear depth sensor 240B. In one example, where a first object, such as a light fixture in a ceiling, is in a first field of view of the front depth sensor 240A and a second object, such as an aisle sign, is in a second field of view of the rear depth sensor 240B, the exact distance between the two objects can be computed. In another example, if the 2×4 feet ceiling tile where the light fixture is located is 10 feet high from the ground, the height from the dual-sided depth sensing device 200 to the light fixture in a first field of view can be detected to be 5 feet and the height of the dual-sided depth sensing device 200 to the ground in a second field of view can be detected to be another 5 feet.

The first configuration of the single-sided depth sensing device 100 may have some errors (e.g., several inches) as a result of the forced rotation of the depth sensor from the ground level up to the light fixture level resulting from operator error. Also the computed distances from the single-sided depth sensing device 100 and dual-sided depth sensing device 100 may also have errors because they can be based on estimates about the height of the operator that carries the depth sensing devices 100 and 200 as a handheld mobile device.

To alleviate certain errors and provide improved accuracy, both the single-sided depth sensing device 100 and the dual-sided depth sensing device 200 can be worn by an installer (e.g., as a headset), or coupled (e.g., mounted on or attached) and carried by autonomous vehicle, such as a robot. A person wearing a headset can be in a position guaranteed to be stationary at least with respect to the height which the depth sensing devices 100 and 200 are being carried, which typically cannot be said of a handheld depth sensing device (e.g., mobile phone, tablet computer, or laptop computer). The headset may be rotated around with a full degree of rotation for a semi-sphere (e.g., 180°) in a first field of view for 100% accuracy. The other half of the sphere (e.g., remaining 180°) is not guaranteed to have accuracy and thus may have errors resulting from the operator rotating their body to see the second field of view. On the other hand, an autonomous vehicle, such as a robot, may provide both a full 360° rotation that is error free and an accurate fixed height for the depth sensing device 100 and 200.

Figure 3:
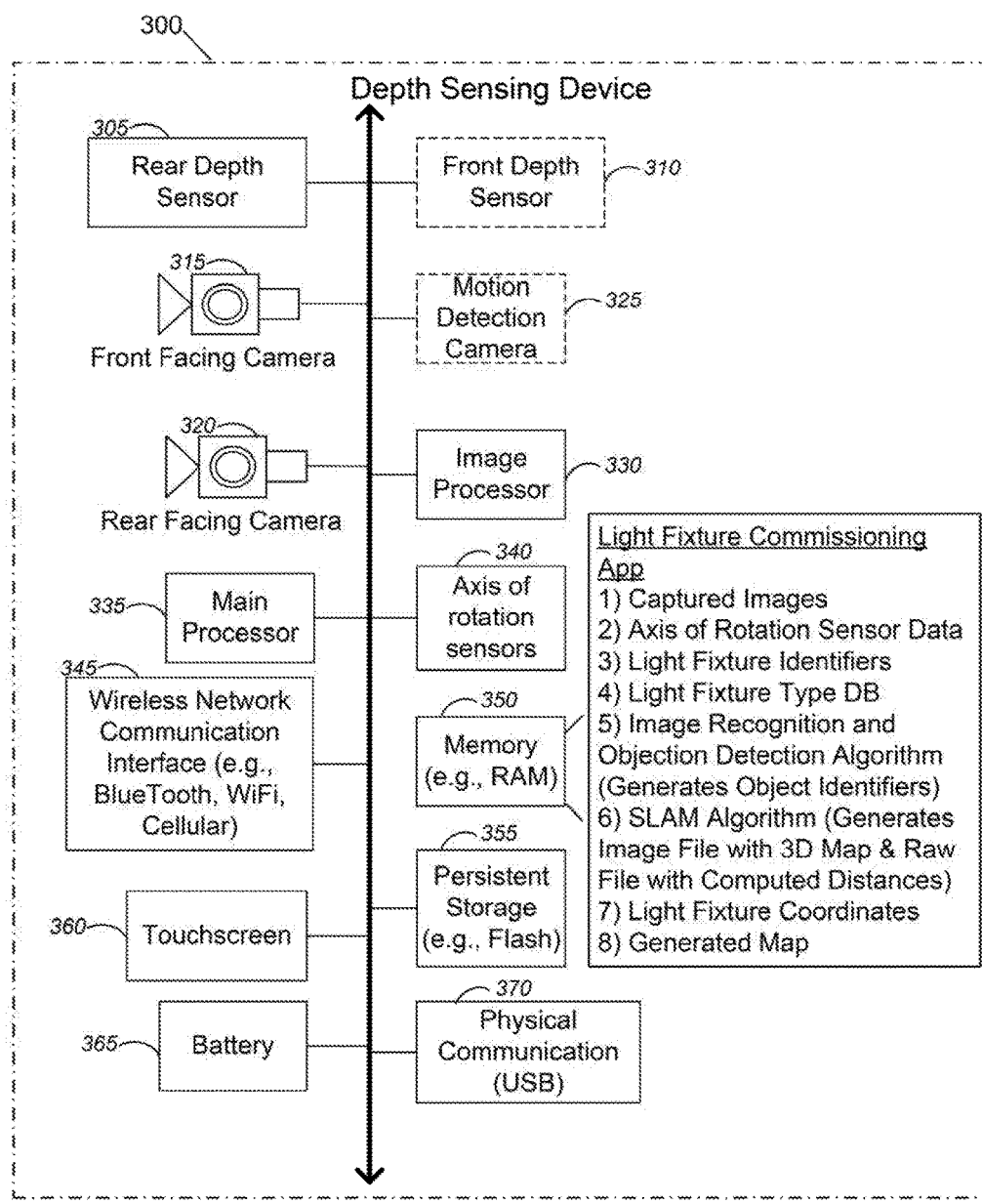
FIG. 3 shows an example of a hardware configuration for the depth sensing devices of FIGS. 1-2, in simplified block diagram form.

FIG. 3 shows an example of a hardware configuration for the depth sensing devices of FIGS. 1-2, in simplified block diagram form. As shown, the depth sensing device 300 includes a rear depth sensor 305, an optional front depth sensor 310, a front facing camera 315, a rear facing camera 320, and an optional motion detection camera 325, which are coupled to an image processor 330 to process captured images. Alternatively, the depth sensors 300 and 305; and cameras 315, 320, and 325 may be coupled to the main processor 335 to process captured images. The depth sensing device 300 further includes various axis of rotation sensors 340, such as a compass, a magnetometer, an accelerometer, or a gyroscope.

A wireless network communication interface 345, such as a Bluetooth, WiFi, ZigBee, or cellular transceiver, is also coupled to the bus of the depth sensing device 300 to send and receive digital or analog communications to and from other devices or over a network. A memory 350 of the depth sensing device 300 can include a light fixture commissioning application to perform the depth sensing procedures and protocols described herein, for example, to build a map with location coordinates of each of the light fixtures in a space. As part of the light fixture commissioning application, various inputs are received, outputs generated, and algorithms executed, some of which are shown as being stored in the memory 350. The memory 350, which is random access memory (RAM) in the example, typically provides non-persistent volatile storage. However, it should be understood that the light fixture commissioning application and any of the depicted inputs, outputs, and algorithms may be stored in non-volatile storage, shown as persistent storage 355, such as flash memory, which is where an operating system (not shown) of the depth sensing device 300 is stored.

As shown in FIG. 3, for example, the captured images from the rear depth sensor 305, optional front depth sensor 310, front facing camera 315, rear facing camera 320, and optional motion detection camera 325 are stored. Further, various light fixture identifiers that are captured in images by the front facing cameras 315 or rear facing camera 320, or received via wireless network communication interface 345 in concert with the images captured by the depth sensors 305 and 310 are also stored in the memory 350. Memory 350 also stores a light fixture type database which is a library to use as a point of reference to determine characteristics of a light fixture, including an angle, shape, or orientation of the light fixture, for example, relative the ground. Characteristics can be retrieved, for example, depending on the light fixture type, for example a pendant down light suspended/hanging from the ceiling, a 2×4 feet light fixture flush mounted on the ceiling, or sconces hung on the wall.

An image recognition and object detection algorithm is also stored in the memory 350 which takes the captured images as an input and is trained to output types of objects the image contains, e.g., aisle sign, type of light fixture, etc. The objects, such as aisle signs, light fixtures, etc. can be recognized by matching, learning, or pattern recognition using appearance-based or feature-based techniques, such as edge matching, gradient matching, divide and conquer search, greyscale matching, histograms of oriented gradients, template recognition, large model bases, etc. The image recognition and object detection algorithms identify the type of object identified, e.g., light fixture, aisle sign, etc. and output an associated object identifier to uniquely identify the object.

As discussed previously, a SLAM algorithm is stored in the memory 350 which generates an image file of a 3-dimensional spatial map of the space and a raw data file with computed distances between objects in the space. The light commissioning application processes the outputs from the image recognition and object detection algorithm and the SLAM algorithm to generate light fixture coordinates and ultimately to generate a map using the protocols described herein. The depth sensing device 300 also includes a touchscreen 360 to receive user input, for example, to initiate scanning of a space and terminate scanning of the space. The depth sensing device 300 also includes a battery 365 to power the device and may include various physical communication interfaces 370, such as universal serial bus (USB).

Figure 4:
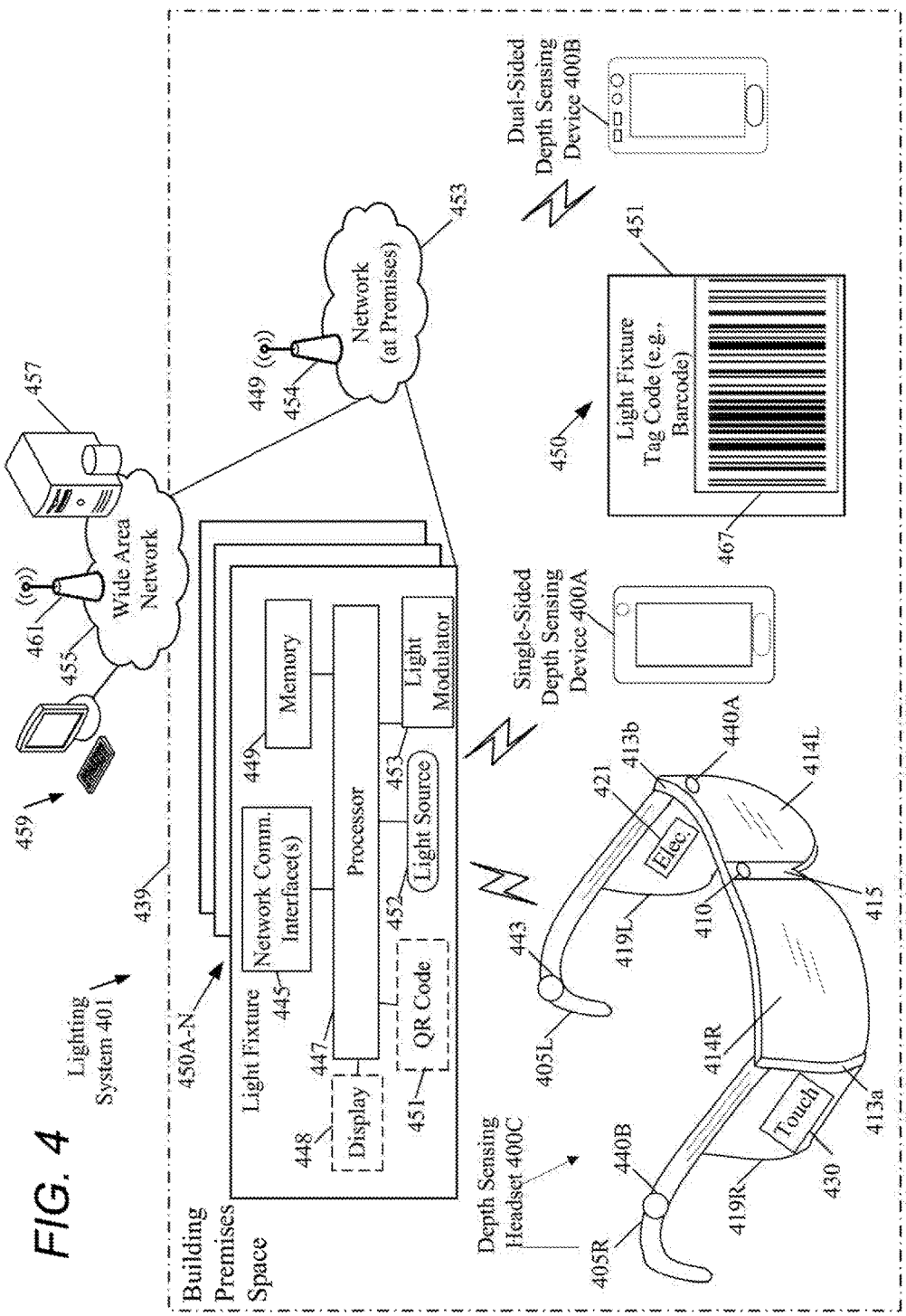
FIG. 4 is a high-level functional block diagram of an example of a lighting system of light fixtures, networks, and other devices; and various types of depth sensing devices designed to commission a light fixture installation, including a single-sided depth sensing device, dual-sided depth sensing device, and a depth sensing headset.

FIG. 4 is a high-level functional block diagram of an example of a lighting system of light fixtures, networks, and other devices; and various types of depth sensing devices designed to commission a light fixture installation, including a single-sided depth sensing device, dual-sided depth sensing device, and a depth sensing headset. As shown, a lighting system 401 in a building premises space includes a plurality of light fixtures 450A-N. Such a system 401 may also include separate standalone sensor units and will often include some number of network connected user interface elements, e.g. configured as wall controllers or the like. For convenience, such sensors and user interface components of the system 401 have been omitted.

In most examples, the light fixtures 450A-N illuminate a service area to a level useful for a human in or passing through the space, e.g. regular illumination of a room or corridor in a building, such as a store, and/or provide an indoor visible light source based positioning system. For purposes of discussion of an example, the drawing shows a system 401 having a relatively high degree of intelligence implemented in the lighting fixtures 450A-N themselves as well as networked communications amongst the light fixtures 450A-N. Hence, in the example, each respective light fixture 450A-N includes a light source 452, as well as a network communication interface 445 and a processor 447 coupled to control the light source 452.

The light source 452 may be virtually any type of light source suitable to providing the intended type of light output that may be electronically controlled. The light source 452, for example, may provide visible light output as providing visible illumination for human occupancy or the like and/or visible light source based positioning. The light source 452 may be of the same general type in all of the lighting fixtures 450A-N, e.g. all formed by some number of light emitting diodes (LEDs); although in many installations, some numbers of the light fixtures 450A-N may have different types of light sources 452, e.g. some use LEDs, some use compact or tube type fluorescent sources, etc.

In addition, the light source may be coupled to a light modulator 453 for visible light communication (VLC). VLC technologies for indoor positioning to determine the position of a mobile device carried by a user are available from Qualcomm Inc. under the trade name Lumicast™. VLC can be done in two different ways. The general illumination lighting can output oscillating light (e.g., projection of a barcode) in combination with the illumination space lighting. Alternatively, if the light fixtures 450A-N is include an optional display 448, VLC can be done by transmitting modulated light through the display 448, for example, having the display flicker.

The processor 447 also is coupled to communicate via the network communication interface 445 and a network link with one or more others of the light fixtures 450B-N and is configured to control operations of at least the respective light fixture 450A. The processor 447 may be implemented via hardwired logic circuitry, but in the examples, the processor 447 is a programmable processor such as the central processing unit (CPU) of a microcontroller or a microprocessor. Hence, in the example of FIG. 4, each light fixture 450A-N also includes a memory 449, storing programming for execution by the processor 447 and data that is available to be processed or has been processed by the processor 447. The processor 447 and memory 449 in the light fixtures 450A-N may be substantially the same in various light fixtures 450A-N throughout the premises, or different light fixtures 450A-N may have different processors 447 and/or different amounts of memory 449, depending on differences in intended or expected processing needs.

In the examples, the intelligence (e.g., processor 447 and memory 449) and the communications interface(s) 445 are shown as integrated with the other elements of the light fixture 450A-N or attached to the light fixture 450A-N or other element that incorporates the light source 452. However, for some installations, the light source 452 may be attached in such a way that there is some separation between the fixture or other element that incorporates the electronic components that provide the intelligence and communication capabilities. For example, the communication component(s) and possibly the processor and memory (the "brain") may be elements of a separate device or component coupled and/or collocated with the light source 450A-N.

Three types of depth sensing devices 400A-C are shown in FIG. 4, including a single-sided depth sensing device 400A, dual-sided depth sensing device 400B, and a depth sensing headset 400C. The single-sided depth sensing device 400A and dual-sided depth sensing device 400B were described previously in FIGS. 1-3. The depth sensing headset 400C incorporates a depth sensing device in the form of eyewear, however, it should be understood that a depth sensing device can also be embodied as other wearable user interface devices, including a head-wearable user interface device, e.g., a helmet, hat, etc.

The depth sensing headset 400C in the example includes a framework configured to enable a user to wear the headset. Where the depth sensing headset 450C is a pair of eyeglasses, such as in the example of FIG. 4, the frame of the glasses forms the framework. Hence, in the example, the framework includes elements such as 413a, 413b forming lens frames for two lenses 414L and 414R, a centerpiece 415 and wings or side-arms of the eyeglass frame shown at 405L, 405R. The example also includes side panels 419L, 419R attached to the respective wings 405L, 405R. The form and framework of the eyeglasses are shown and discussed by way of example only. Other eyewear styles and arrangements of frame elements may be used. For example, although shown as two lenses, some styles may use a single transparent panel. Other eyewear examples may not include actual lenses, depending on the display technology and/or on other intended uses of the eyewear.

Depth sensing headset 400C in the example also may take other forms and therefore may incorporate still other types of framework. Another headgear type of the form factor, for example, is a helmet, e.g. for a worker at a construction site. As noted, in the eyewear example, with two lenses, the frame of the eyeglasses includes two lens frames as well as two wings attached to opposite sides of the lens frames; however, in a helmet example, the shell of the helmet serves as or forms at least part of the framework for the headgear type wearable user interface device.

The depth sensing headset 400C, in the example, includes one or more depth sensors, cameras, or inputs usable to detect, identify and/or communicate with a light fixture or system of light fixtures and perform depth sensing. Returning to the illustrated eyewear, by way of an example, the depth sensing headset 450C includes a front facing camera 410 and a rear facing camera 443. In the example, the front facing camera 410 is mounted on the centerpiece 415 between the lenses 414L and 414R. Other positions and mounting arrangements may be used for the front facing camera 410. The front facing camera 410 and rear facing camera 443 in the example is of a type the same as or similar to cameras used in smartphones and other portable/mobile devices, capable of capturing still images and video. Such an example utilizes a camera that is sensitive to at least a substantial range of the visible light spectrum. For lighting purposes, the front facing camera 410 and rear facing camera 443 can be used to identify light fixtures are previously described.

The depth sensing headset 400C also includes a front facing depth sensor 440A and a rear-facing depth sensor 440B sensitive to energy in the infrared regions of the light spectrum. In a first configuration, where both depth sensors 440A-B are provided, the depth sensing headset 400C operates similar to the dual sided depth sensing device 400B described previously. In a second configuration, when the rear facing depth sensor 440B is not included in the depth sensing headset 400C, operation is similar to the single-sided depth sensing device 400A.

The front facing camera 410 and front depth sensor 440A are shown directed along the wearer's field of view to allow the ground level objects of the installation space to be viewed and to capture images of distortions of patterns of projected infrared light on the objects. The rear facing camera 443 and the rear depth sensor 440B has a different orientation, with a field of view in another direction, e.g. straight up to the light fixtures in the example, or up or down at an angle with respect to eye field of view. The straight up field of view allows detection of VLC light codes by the rear facing camera 443 and depth sensing by the rear depth sensor 440B without requiring the user/wearer to look directly at a bright source of light from a light fixture 450A-N. In some arrangements, the camera angles may be adjustable.

The depth sensing headset 400C includes a display supported by the framework so as to be viewable by at least one eye of the user when wearing the headgear. In an example, images captured by the rear facing camera 443 of a first field of view with light fixtures and images captured by the front facing camera 441 of a second field of view with objects (e.g., an aisle sign) are viewed on the display to ensure that the user is cognizant which of the different areas in the space are being scanned.

In the example, one or both of the lenses 414L and 414R serve as the display (as well as allowing light to pass through to the eye(s) of the wearer of the headgear). For such an implementation, each lens element 414L or 414R intended to serve as a display may be formed of or coated with material(s) to display data (e.g. text and/or still or video images) while still retaining sufficient transparency to allow the wearer to see and observe objects through the respective lens. However, the display need not be transparent, the device could be configured such that the display presents the camera image in real time (to appear as if seen through a lens) with a presentation of data as an overlay on the real-time image. In the example, the display covers primary lines of sight or field of view of at least one of the user's eyes. Other configurations, however, may provide the information display at a somewhat more peripheral position, e.g. located slightly outside the user's primary line(s) of sight/field(s) of view.

Processing of information may be done on depth sensing devices 400A-C and/or in other data processors that communicate with the depth sensing devices 400A-C. The depth sensing devices 400A-C, for example, could be relatively "dumb" with little or no processor capability within the device itself; in which case, the processing is done in the cloud by host/server computer 457, so to speak. In such a case, the depth sensing headset 400C, for example, may include only sufficient circuitry to process received information so as to output the information to the wearer, e.g. to display received data like on a monitor. Alternatively, the depth sensing devices 400A-C, such as the depth sensing headset 400C, may be a relatively intelligent device with significant internal processing capability.

The depth sensing headset 400C also includes a wireless communication interface (e.g., a transceiver), a processor, a memory, and programming in the memory. The processor and memory are supported by the framework of the depth sensing headset 400C. In the example, the processor and memory would be part of the electronics 421. Although the electronics may be mounted in various other ways and/or at other positions on the depth sensing headset 400C, in the example, the electronics 421 are located on the left side panel 419L. In the example, the wireless communication interface is included on or in the framework of the depth sensing headset 400C, e.g. as a further element of the electronics 421 on the panel 419L.

The depth sensing headset 400C may include a user input device or mechanism supported by the framework, e.g. in the form of a hardware sensor and/or logic to sense a condition via the hardware sensor or via the sensor that detects the lighting fixtures 450A-N (e.g., via the camera). The user input in the example is a touchpad 430 or other type of touch sensor shown at in FIG. 4. A touchpad 430, for example, may be a capacitive or other type of touch sensor similar to but typically smaller in size than touchpads commonly used today on user terminal type computer devices. Although the touchpad 430 may be mounted in various other ways and/or at other positions on the depth sensing headset 400C, in the example, the touchpad 430 is located on the right side panel 419R. In that location, the touchpad 430 has a touch surface exposed for touching by one or more fingers of the wearer's right hand. For left hand operation, a similar touchpad could be provided on the left side panel 419L, instead of or in addition to the touch pad on the right side panel 419R. The user input could also be gestural through camera(s) (e.g. to detect hand movements, eye movements), through buttons on the framework, voice activated through a microphone or bone vibration sensor, through rapid positional movements of the wearer's head using an accelerometer and/or gyro (e.g. flick head up rapidly), brain computer interfaces, etc. Another approach might use voice input and speech recognition to detect user inputs.

Although not shown, in addition to the elements discussed above, the depth sensing headset 400C may include one or more axis of rotation sensors as described previously. The processor is coupled to the display, the camera, the transceiver and the input, the processor being configured to control operations of the depth sensing headset 400C and has access to the programming in the memory. In addition to normal operations of the depth sensing headset 400C, the programming for the processor configures the headgear 400C in our example to perform lighting related operations very similar to the single sided depth sensing device 400A and dual-sided depth sensing device 400B.

Examples of consumer devices that may serve as the depth sensing headset 400C, having combinations of various capabilities like those outlined above, which are now or likely will soon be available on the market, include Google Glass, Recon Jet, Vuzix M100, GlassUp, Meta SpaceGlasses and Telepathy.

As further shown in FIG. 4, the light fixture 450 includes a unique tag code 467 (e.g. paint on code, adhered barcode, QR code, RFID tag, etc.). The depth sensing devices 400A-C can read the tag code 467 as an image, for example, captured by the depth sensor of the depth sensing device 400A-C. As described above, the tag code on the light fixtures 450A-N may fluoresce in response to emission of infrared light by the infrared projector of the depth sensing devices 400A-C to uniquely identify the light fixtures 450A-N.

In our example, the lighting system 401 is installed at a building premises. The system 401 also includes a data communication network 454 that interconnects the links to/from the network communication interfaces 445 of the light fixtures 450A-N, so as to provide data communications amongst the light fixtures 450A-N. The data communication network 454 may support data communication by equipment at the premises via wired (e.g. cable or optical fiber) media or via wireless (e.g. WiFi, Bluetooth, ZigBee, LiFi, IrDA, etc.) or combinations of wired and wireless technology. Such a data communication network 454, for example a short range or local area network (LAN), also is configured to provide data communications for at least some of the light fixtures 450A-N and other equipment at the premises, including the illustrated depth sensing devices 400A-C via a data network 455 outside the premises, shown by way of example as a wide area network (WAN), so as to allow light fixtures 450A-N and depth sensing devices 400A-C at the premises to communicate with outside devices such as the server/host computer 457 and the user terminal device 459.

The wide area network 455 outside the premises may be a cellular data network, Internet, etc., for example. In one example, the depth sensing devices 400A-C transmit via the networks 454 and/or 455 various captured images from the depth sensors and cameras, axis of rotation sensor data, and light fixture identifiers to the server/host computer 457. The server/host computer 457 includes the light fixture commissioning application and the light fixture type database. In response to receiving the various images, axis of rotation sensor data, and light fixture identifiers, the server/host computer 457 executes the image recognition and object detection algorithm, SLAM algorithm, etc. in order to determine light fixture location coordinates and build a map of the space.

Figure 5:
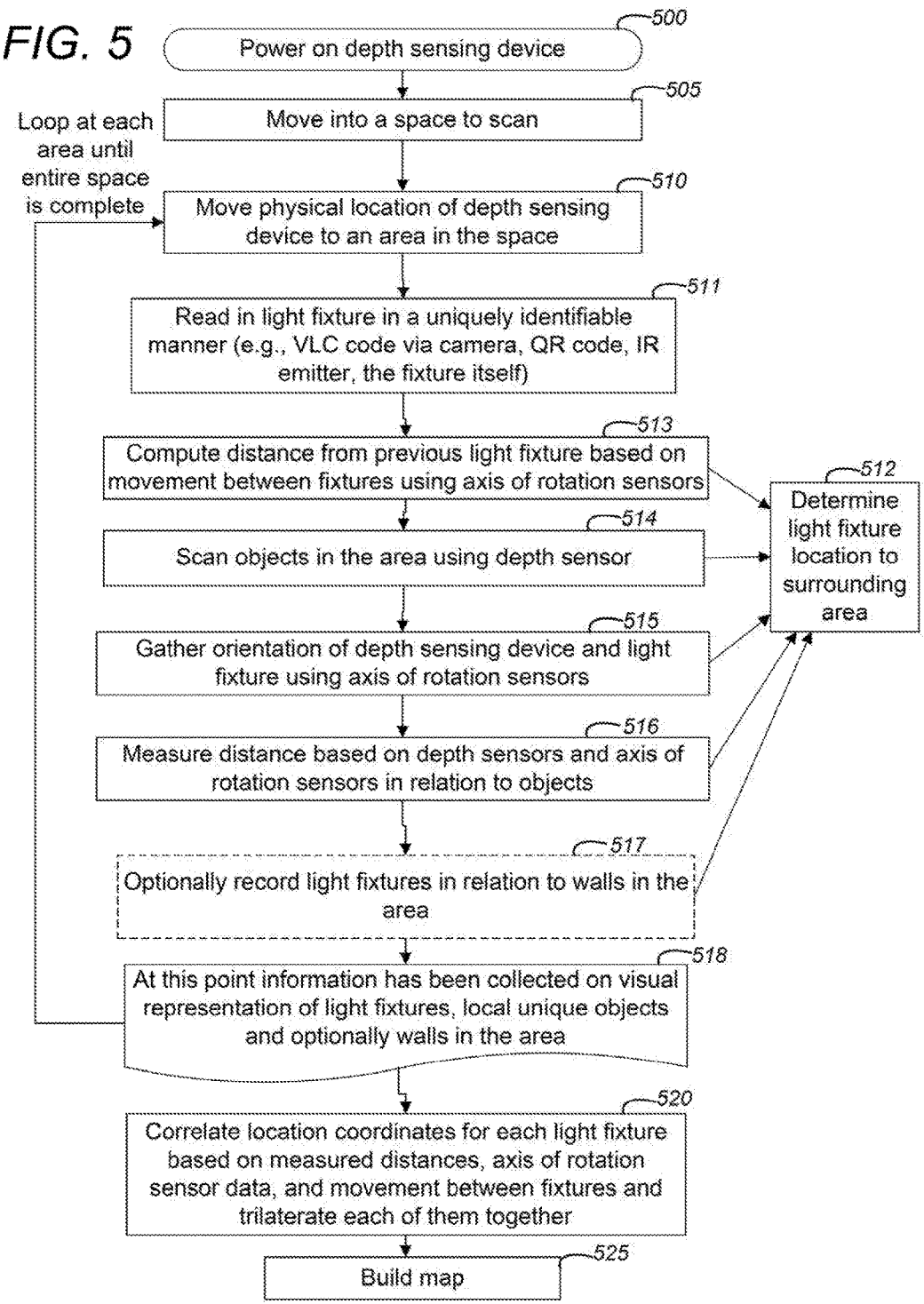
FIG. 5 is a flowchart of the operation of the depth sensing device when locating and commissioning light fixtures within an installation space.

FIG. 5 is a flowchart of the operation of the depth sensing device when locating and commissioning light fixtures within an installation space. Utilizing the depth sensing devices and protocols and procedures described herein, light fixtures can be located for indoor visible light based positioning systems and/or general commercial indoor space lighting. For example, an installer can create an exact map of a retail space to allow for indoor visible light based positioning systems. Although shown as occurring serially, the blocks of FIG. 5 may be reordered or parallelized depending on the implementation.

Beginning in block 500, the depth sensing device is powered on. The depth sensing device can be a handheld mobile device carried by a human operator (e.g., installer), or worn, e.g., a headset. A depth sensing headset is in a relatively stationary position, which is typically not the case for a handheld mobile device (e.g., mobile phone, tablet computer, laptop computer, etc.). Alternatively, the depth sensing device can be coupled to and operated by an autonomous vehicle, such as a robot.

Continuing to block 505, the depth sensing device moves into a space where scanning is desired. The space includes various objects, including objects of interest and light fixtures, spread throughout different areas of the space. In one example, the space is a grocery store and the aisles include various objects of interest, such as aisle signs, boxes of cereal, etc. In this example, the aisle signs may be known objects whose location coordinate are known and the boxes of cereal are just regular objects of interest. The depth sensing device may include a user interface, such as a touch screen located on a front side of the depth sensing device for displaying a graphical user interface (GUI) to receive a user input to initiate scanning of the space. In response to receiving the user input to initiate scanning of the space, the depth sensing device commences functions to scan the space. In other examples, the user interface may display a GUI, but receive the user input to initiate scanning of the space without a touch screen type input, for example a keyboard can be used.

Moving to block 510, the human operator or robot moves the physical location of the depth sensing device to various areas of the space. The human operator or robot stops at each area and performs blocks 511-518.

Proceeding to block 511, the depth sensing device reads in a light fixture in the area to uniquely identify the light fixture. For example, a VLC code, QR code, Bluetooth identifier, painted on code, or IR emitter code may uniquely identify the light fixtures in the area.

In block 512, the light fixture location in relation to the surrounding area is determined. As shown, block 512 is broken out into sub-blocks 513-517. Continuing to block 513, the distance of movement between light fixtures, for example, from a previous light to a new light fixture is computed using axis of rotation sensor (e.g., accelerometer) data. For example, when the depth sensing device is moved throughout the space, the axis of rotation sensors determine the operator has walked six feet. Such measurements are tracked as the operator or robot moves from fixture to fixture, for example, to justify that the light fixtures are spaced 6 feet apart.

Moving to block 514, the depth sensing device scans objects in the area using a depth sensor. In one example, the depth sensing device includes a depth sensor including an infrared projector to project a pattern of infrared light in the area and an infrared camera to capture distortions of the pattern of the projected infrared light by objects in the area. The types of the objects in the area, including light fixtures, may also be identified from the images captured by the infrared camera and/or using the front facing and rear facing cameras using an image recognition and object detection algorithm. Image recognition and object detection algorithms, which were previously described, can use machine learning (e.g., Google Photos®) to uniquely identify object types. Using such image recognition and object detection algorithms, known objects, such as aisle sign and light fixtures can be detected and this can occur simultaneously with the light fixture being read in and identified in block 511.

In block 515, the orientation of the depth sensing device and light fixtures that were previously identified in the area are detected. For example, using various axis of rotation sensors in the depth sensing device, such as an accelerometer, the angle orientation (e.g., vertical, horizontal, or tilted) of the depth sensing device relative to the ground can be determined. In addition, based on the type of light fixture identified in block 514, a light fixture database is searched to determine the angle of the light fixture relative to the ground. For example, the angle of a 2×4 feet light fixture relative to the ground is retrieved from the light fixture database. The angle between the depth sensing device and ground and the angle between the light fixture and the ground can be compared to find the angle between the light fixture and the depth sensing device.

Moving to block 516, the distance based on depth sensors, and other internal sensors in relation to objects in the area of the space is measured for the light fixtures in the area. Distances between the detected objects in the images captured by the infrared camera in block 514 to various light fixtures are computed. For example, the distorted dot pattern in the captured image can be processed by an image processor to determine distance from the displacement of dots. Typically, nearby objects have a pattern with dots spread further apart and far away objects have a denser dot pattern. In one example, a single field of view has two light fixtures that are proximate a known object, which is an aisle sign displaying the text hockey sticks. Distances between the two light fixtures (e.g., a previous light fixture and current light fixture) and the aisle sign are measured based on distortions of the patterns of the infrared light captured by the infrared camera. The measured distances between the two light fixtures and the aisle sign and the measurements taken in block 513 of the distance of movement between the two light fixtures will be used by the SLAM algorithm executed in blocks 520 and 525.

Proceeding now to block 517, the relationship of light fixtures compared to the walls in the area of the space are optionally recorded to facilitate mapping of the overall space. For example, when light fixtures are commissioned, typically an architectural floor map is available. To make a visual overlay easier at the end of the procedure in blocks 520 and 525, the orientation of the light fixture relative to walls can be tracked, for example, if a light fixture is near a corner or joint of the ceiling. Aisles that appear near a wall may also be considered a wall.

Moving to block 518, at this point, information has been collected on distances, visual representation of the light fixtures, and local and unique objects and walls in the particular area of the space. As shown in FIG. 5, blocks 510-518 are repeated for all areas in the space.

In block 520, when the loop through blocks 510-518 is complete, a table is built of all light fixtures distance in relation to objects and/or in relation to each other, which can then be used to determine location coordinates of objects, such as light fixtures. Location coordinates of each of the light fixtures can be found using correlation techniques that can include trilateration and/or triangulation of the light fixtures relative to objects whose locations are known. In particular, location coordinates may be determined based on distance of movement between each light fixture utilizing axis of rotation sensors (block 513), detected angle orientations of the depth sensing device and objects (block 515) using axis of rotation sensors, and measured distances to objects utilizing depth sensors (block 516).

Once distance is calculated (i.e., measured) from the depth sensor of a depth sensing device to an object, a given distance exists to an object in the space relative to the depth sensing device as described in block 516. If this is done a number of times, at minimum three, distances from the location of the depth sensing device to three unique objects. The resulting number is the location coordinates of the depth sensing device relative to the trilaterated objects. In each case, there is distance measured with the depth sensor, from different locations, requiring both angles and distances to compute the proper coordinate.

In a first configuration where a single-sided depth sensing device is used, triangulation and trilateration can be combined together, solving for the virtual triangles, including angle and distance. The angle can be important because the direction being faced may need to be stored, whether it's the ceiling, facing forward, looking down or any other direction. The same principles can be applied to a dual-sided depth sensing device and depth sensing headset.

While each of the configurations (single-sided depth sensing device, dual-sided depth sensing device, and depth sensing headset) are not different in terms of the calculations being done, the dual-sided depth sensing device can supply more information than the single-sided depth sensing device, and the depth sensing headset may provide more information than the dual-sided depth sensing device. Hence, more areas of the space may need to be covered, such as by walking around the space more to take further samples with the single-sided depth sensing device; whereas the dual-sided depth sensing device and depth sensing headset can supply more relevant information in a given sampling sequence, requiring less overall measuring time.

Moving to block 525, a map is built that includes the location coordinates for each light fixture. Of note, in the example, although blocks 520 and 525 are shown as occurring serially, but blocks 520 and 525 can and typically occur simultaneously in an iterative loop as location coordinates for each object (e.g., light fixture) are determined. A SLAM algorithm can generate a physical map of all objects in the space. As the map is being generated, the objects are identified and associated with unique identifiers so that trilateration and/or triangulation correlation techniques can be performed. When the various objects are detected in different places, a polygon can be overlaid onto the map with an object with known coordinates of origin, and then the local coordinates of the objects can be calculated based on the known coordinates via trilateration and/or triangulation relative to the known object. The output of the SLAM algorithm is a 3-dimensional visual map and raw data with distances between objects, and the raw data is generated as the map is being created. The SLAM algorithm can receive object identifiers for the objects as input, such as known objects and light fixtures, and the SLAM algorithm tags the objects with the inputted identifiers as the map and raw data is generated to allow for trilateration and/or triangulation between the objects.

Figure 6:
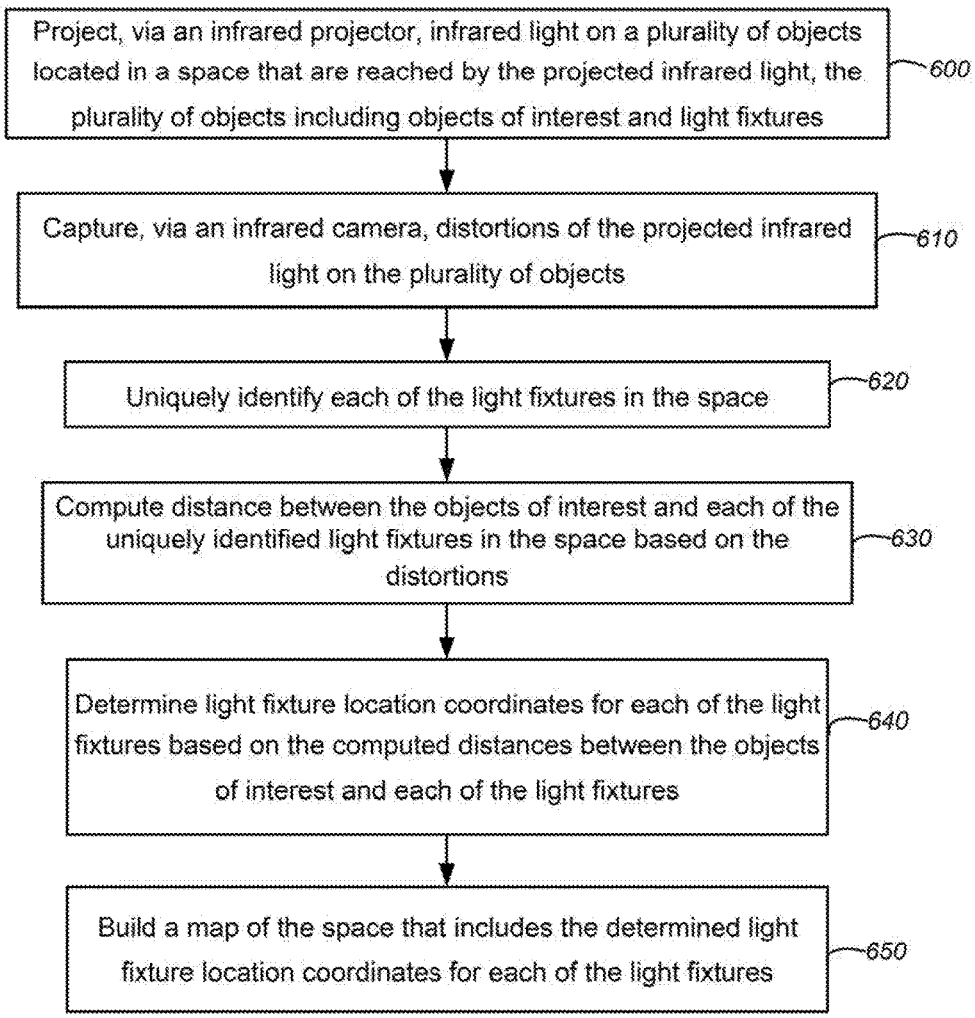
FIG. 6 is another flowchart of the operation of the depth sensing device when locating and commissioning light fixtures in a space within which light fixtures are being installed.

FIG. 6 is another flowchart of the operation of the depth sensing device when locating and commissioning light fixtures in a space within which light fixtures are being installed. Although shown as occurring serially, the blocks of FIG. 6 may be reordered or parallelized depending on the implementation. In the example, the space is 3-dimensional, hence it should be understood that the light fixture location coordinates that are solved for include 3 Cartesian coordinates (X, Y, Z).

The blocks in the flowchart can be executed by one or more hardware devices in a lighting system, which may include a depth sensing device, such as single-sided depth sensing device, dual-sided depth sensing device, and a depth sensing headset. The lighting system may also include a host computer coupled to the depth sensing device via a network. Examples of such a system is shown in FIG. 4, and details of the depth sensing devices are shown in FIGS. 1-3. The depth sensing device includes a depth sensor that has an infrared projector to project a pattern of infrared light and an infrared camera to capture distortions of the pattern of the projected infrared light by objects in a space that includes light fixtures for commissioning. The system also includes a processor coupled to the depth sensor, a memory accessible to the processor, and programming in the memory, wherein execution of the programming by the processor configures components of the system, such as the depth sensing device and/or host computer, to perform some or all of the blocks outlined below.

Beginning in block 600, a depth sensing device projects, via an infrared projector, a pattern of infrared light on a plurality of objects located in a space that are reached by the projected infrared light. The plurality of objects include objects of interest and light fixtures in the space. Moving to block 610, the depth sensing device captures, via an infrared camera, distortions of the pattern in the projected infrared light on the plurality of objects.

Moving to block 620, the depth sensing device or host computer uniquely identifies each of the light fixtures in the space. Uniquely identifying each of the light fixtures in the space can be done simultaneously with the infrared light being projected or captured. In one example, uniquely identifying each of the plurality of light fixtures in the space includes: capturing, via the infrared camera, infrared light reflected off of each of the plurality of light fixtures and decoding the reflected infrared light of each respective one of the light fixtures into a respective quick response (QR) code that uniquely identifies the respective light fixture.

In another example, the distortions of the pattern in the projected infrared light are captured by the infrared camera in a first field of view. The depth sensing device further includes a second camera to capture one or more images including modulated visible light from at least one of the light fixtures in a second field of view and the processor is coupled to the second camera. And uniquely identifying each of the light fixtures in the space includes: demodulating the modulated visible light in the second field of view from the captured one or more images to identify a respective visible light communication (VLC) identifier of each of the light fixtures. The depth sensor and the second camera can be operated simultaneously to allow the projecting and capturing of the infrared light to occur at a same time as unique identification of light fixtures.

In another example, the depth sensing device further includes: a network communication interface (e.g., wireless radio communication interface) configured for wireless communication with the light fixtures over a wireless lighting commissioning network. And uniquely identifying each of the light fixtures in the space includes: receiving, via the wireless communication interface, a respective light fixture identifier to uniquely identify a respective light fixture. The respective light fixture identifier to uniquely identify the respective light fixture can be received simultaneously with the infrared light being projected or captured. It should be understood that the network communication interface may be wired instead of wireless and can also support communication over a lighting control network.

Proceeding to block 630, the depth sensing device or host computer computes distances between the objects of interest and each of the uniquely identified light fixtures in the space based on the distortions. For example, the distorted dot pattern in the captured images can be processed by an image processor to determine distance from the displacement of dots. Typically, nearby objects have a pattern with dots spread further apart and far away objects have a denser dot pattern. Continuing to block 640, the depth sensing device or host computer determines light fixture location coordinates for each of the light fixtures based on the computed distances between the objects of interest and each of the light fixtures.

In one example, the depth sensing device further includes a touch screen located on a front-facing side of the depth sensing device; and at least one of a red, green, and blue (RGB) camera or a black and white (BW) camera. The infrared projector and the infrared camera of the depth sensor are rear-facing relative to the touch screen located on the front-facing side of the depth sensing device. The depth sensing device can further include a second depth sensor including a second infrared projector and a second infrared camera; and the second infrared projector and the second infrared camera are front-facing.

Accordingly, block 630, computing the distance between each of the light fixtures and the objects of interest in the space based on the distortions of the pattern can include: measuring an object of interest distance between the depth sensing device and a first known object of interest in the space for which location coordinates are known based on a first distortion pattern on the first object of interest captured by the rear-facing infrared camera of the depth sensor. And block 630, can further include: measuring a light fixture distance between a first light fixture and the depth sensing device based on a second distortion pattern on the first light fixture captured by the front-facing infrared camera of the second depth sensor. In this example, block 640, determining light fixture location coordinates for each of the light fixtures can include: correlating the light fixture coordinates of the first light fixture based on the known coordinates of the first known object of interest, the light fixture distance, and the object of interest distance.

In another example, block 630, computing the distance between each of the light fixtures and the objects of interest in the space based on the distortions of the pattern includes: measuring distance between a first light fixture and a first known object of interest in the space for which location coordinates are known based on a distortion pattern on the first light fixture and the first known object of interest relative to the depth sensing device. And block 640, determining light fixture location coordinates for each of the light fixtures includes: correlating the light fixture coordinates of the first light fixture based on the known coordinates of the first known object of interest and the computed distance between the first light fixture and the first known object of interest.

In another example, block 630, computing distance between the objects of interest and each of the light fixtures in the space based on the distortions of the pattern includes: measuring distance between each of the light fixtures and at least three objects of interest in the space for which location coordinates are known. And block 640, determining light fixture location coordinates for each of the light fixtures includes: trilaterating a respective light fixture relative to the at least three objects of interest.

In an example, the depth sensing device further includes an accelerometer; and the processor is coupled to the accelerometer. Although not shown in FIG. 6, the depth sensing device or host computer identifies a known object of interest for which location coordinates are known. In response to identifying the known object of interest for which location coordinates are known, the depth sensing device or host computer tracks, via an accelerometer, an object of interest distance between the known object of interest and a first light fixture. Block 640, determining light fixture location coordinates for each of the light fixtures includes: determining the light fixture coordinates of the first light fixture further based on the known object of interest distance.

In another example, the depth sensing device further includes an accelerometer; and the processor is coupled to the accelerometer. Although not shown in FIG. 6, the depth sensing device or host computer, in response to uniquely identifying each light fixture in the space, repeats the functions to project, capture, and compute distance; and track, via an accelerometer, a discovery distance between where a new light fixture is uniquely identified in the space and where a prior light fixture is uniquely identified in the space. Block 640, determining light fixture location coordinates for each of the light fixtures includes: determining the light fixture coordinates further based on the discovery distance.

In another example, the depth sensing device further includes at least one axis of rotation sensor; and the processor is coupled to the at least one axis of rotation sensor. Although not shown in FIG. 6, the depth sensing device or host computer, measures, via the at least one axis of rotation sensor, a device orientation angle of the depth sensing device as the infrared light is being projected or captured via the depth sensor on the objects of interest. The depth sensing device or host computer determines a light fixture orientation angle of each of the light fixtures as each of the light fixtures are being uniquely identified based on a light fixture type. The depth sensing device or host computer calculates a relative orientation angle of each of the light fixtures relative to at least three objects of interest for which location coordinates are known by comparing the device orientation angle and the light fixture orientation angle. Block 640, determining light fixture location coordinates for each of the light fixtures includes: triangulating a respective light fixture relative to the at least three objects of interest. The at least one axis of rotation sensor can includes at least one of a compass; a magnetometer; an accelerometer; or a gyroscope.

Finishing now in block 650, the depth sensing device or host computer builds a map of the space that includes the determined light fixture location coordinates for each of the light fixtures.

In an example, the depth sensing device further includes: a user interface, such as a touch screen located on a front side of the depth sensing device for displaying a graphical user interface (GUI) to receive a user input to initiate scanning of the space; and the processor is coupled to the touch screen. The depth sensing device or host computer, in response to receiving the user input to initiate scanning of the space, commences the functions to project, capture, uniquely identify each of the light fixtures, compute distance, determine light fixture location coordinates, and build the map of the space.

In one example, the depth sensing device includes the processor, the memory, and the programming. The system also includes a robot having a 360° range of motion to carry and operate the depth sensing device.

In another example, the depth sensing device includes the processor, the memory, and the functions of the programming to project, capture, and uniquely identify each of the light fixtures. The system also further includes: a headset to carry and operate the depth sensing device; and a host computer coupled to the depth sensing device via a network. The host computer includes a second processor, a second memory, and the functions of the programming to compute distance, determine light fixture location coordinates, and build the map of the space.

FIGS. 7A-B depict a single-sided depth sensing device with a first field of view for a depth sensor and a second field of view for a camera receiving a visual light communication (VLC) code from a light fixture. As shown, a single-sided depth sensing device 700A is oriented such that the light fixtures 750A-N in a space 701 are visible in a front field of view 710A where an RGB or black and white camera captures images of VLC codes that are encoded in visible light emitted by light fixtures 750A-N to uniquely identify themselves. In a rear field of view 710B, a depth sensor of the single-sided depth sensing device 700A captures images of distortions in the projected infrared light by one or more objects, such as known objects whose location coordinates are known and other objects of interest, at the ground level in the rear field of view 710B. Although not shown, the single-sided depth sensing device 700A can be rotated to allow the depth sensor of the single-sided depth sensing device 700A to capture images of distortions in the projected infrared light by the light fixtures 750A-N.

FIG. 7C depicts a depth sensing headset or autonomous vehicle carrying a depth sensing device with an upper field of view 710C. As shown, the depth sensing headset or robot 700C is oriented such that the light fixtures 750A-N in the space 701 are visible in an upper field of view 710C where a depth sensor of the depth sensing headset or robot 700C captures images of distortions in the projected infrared light by the light fixtures 750A-N in the upper field of view 710C.

Figure 8A:
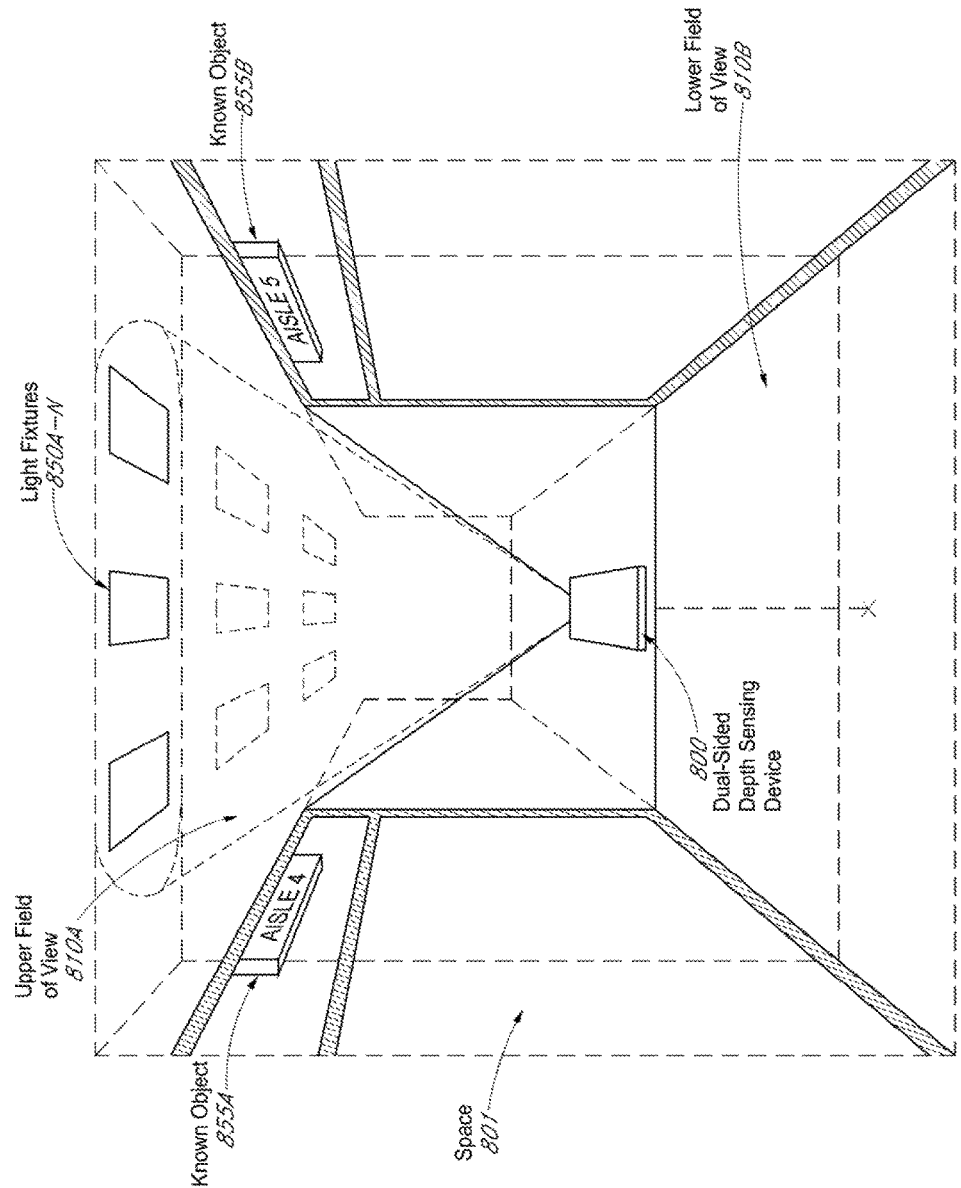
FIGS. 8A-C depict a dual-sided depth sensing device with two fields of view.
Figure 8B:
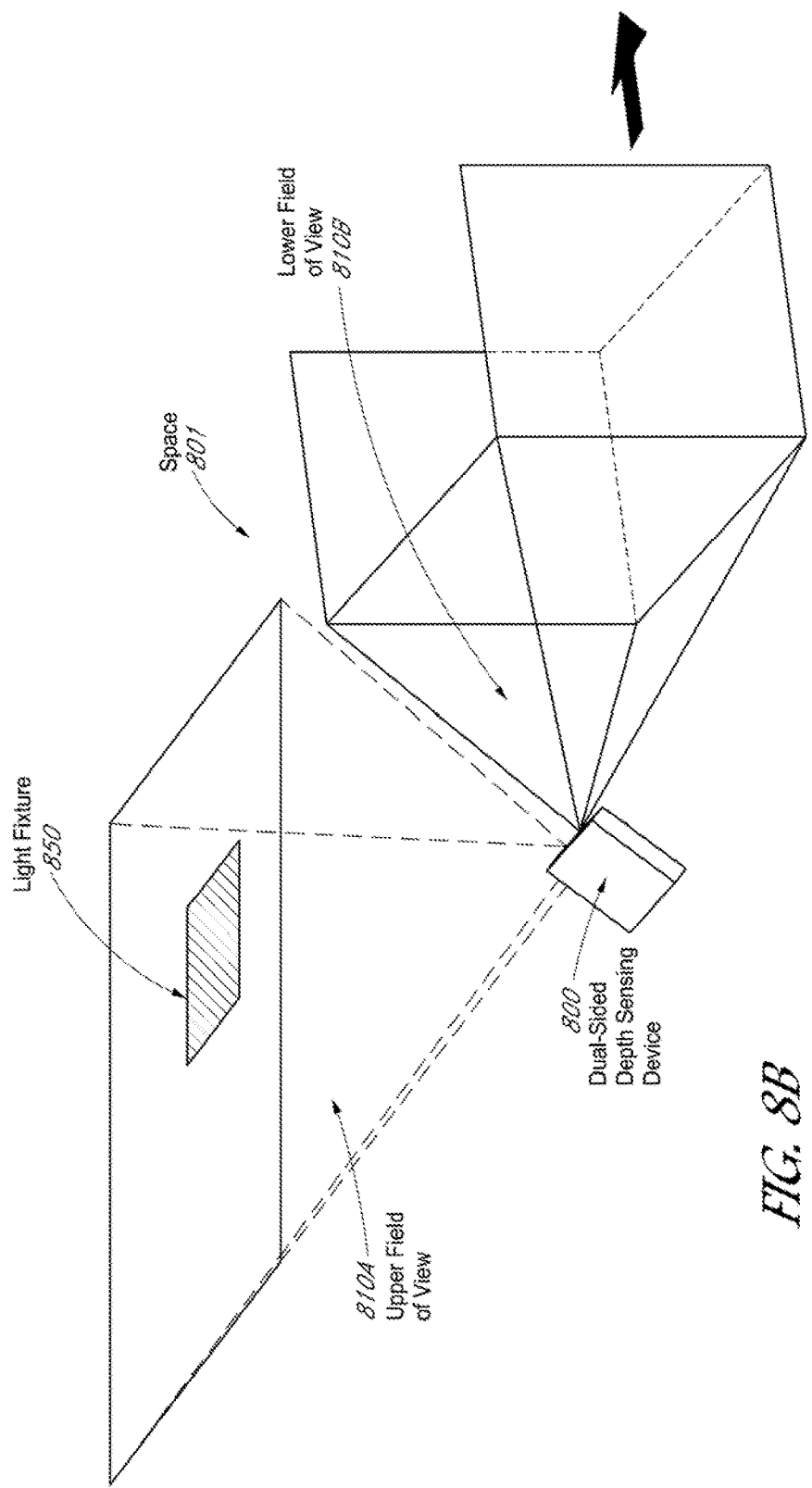
Figure 8C:
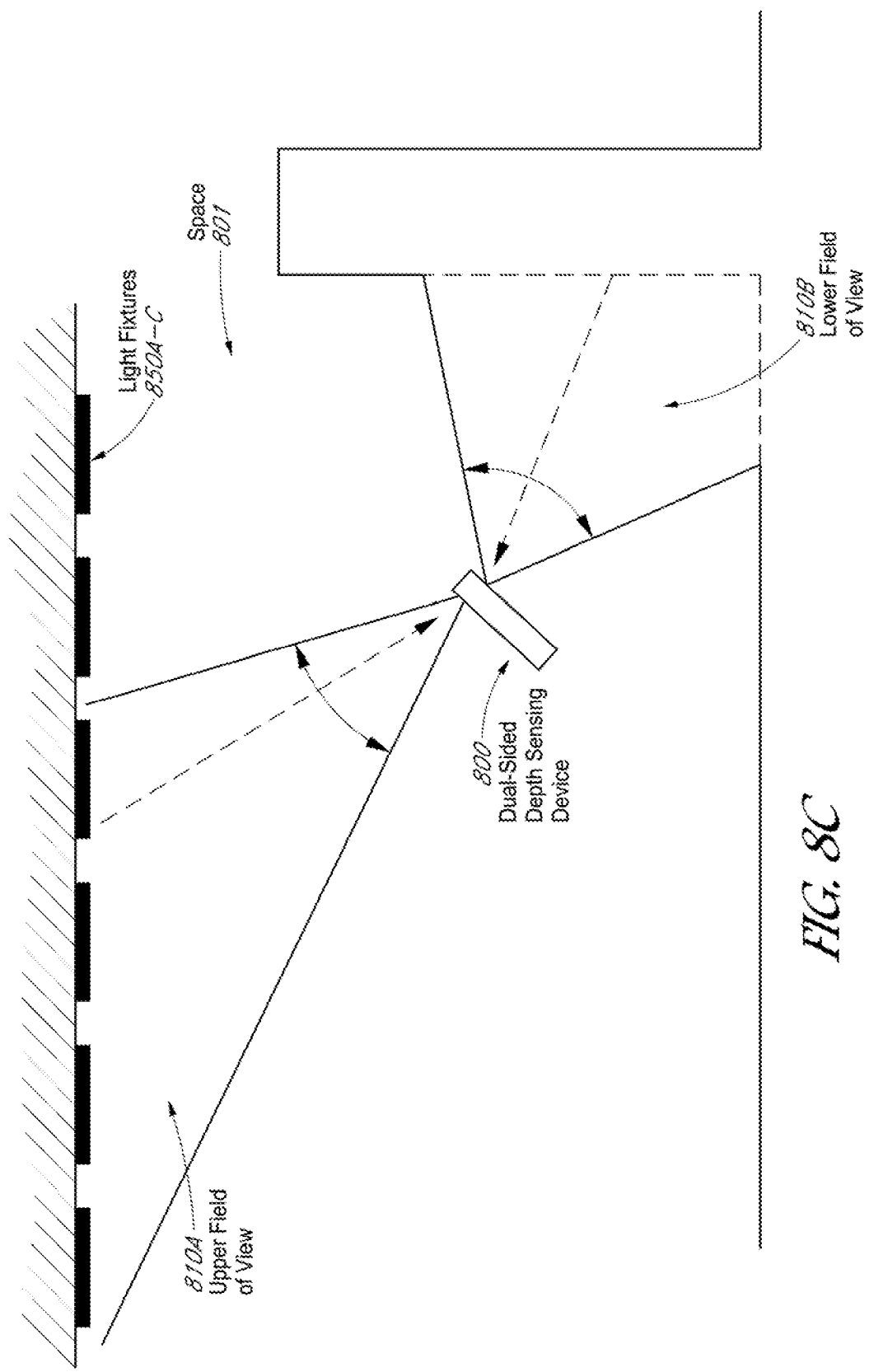

FIGS. 8A-C depict a dual-sided depth sensing device with two fields of view. As shown, the dual-sided depth sensing device 800 is oriented such that a first (e.g., front) depth sensor of the dual-sided depth sensing device 800 captures images of distortions in the projected infrared light by light fixtures 850A-N in a space 801 that are visible in an upper field of view 810A (e.g., front field of view). In a lower field of view 810B (e.g., rear field of view), a second depth sensor of the dual-sided depth sensing device 800 captures images of distortions in the projected infrared light by one or more objects. Although not shown, the dual-sided depth sensing device 800 can be oriented or rotated in a more vertical manner as opposed to the tilted orientation as shown in FIG. 8A to allow either one of the two depth sensors of the dual-sided depth sensing device 800 to capture images of distortions in the projected infrared light by the known objects 855A-B (e.g., aisle signs).

In one example, non-infrared reflective paint codes (e.g., QR codes) are used to identify light fixtures 850A-N on the ceiling in the upper field of view 810A from the images captured by the infrared camera of the depth sensor. On a generated map, the light fixtures 850A-N may appear as empty borders.

Figure 9:
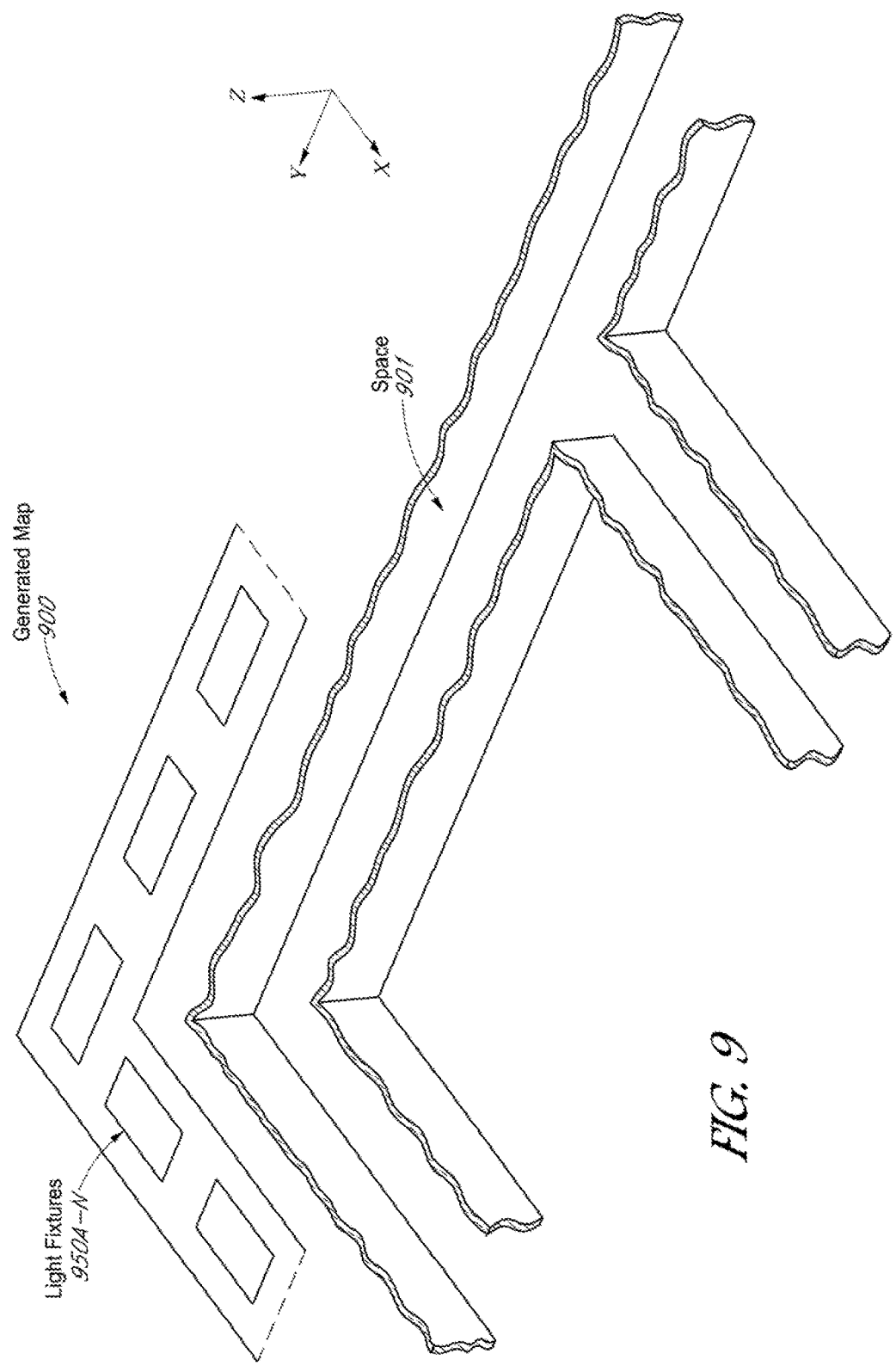
FIG. 9 depicts an example of a map being generated for a commissioning process utilizing depth sensing.

FIG. 9 depicts an example of a map being generated. As shown, the generated map 900 is a 3-dimensional map that has a Cartesian coordinate system (X, Y, Z) to map the space 901. Eventually, a map of the environment of the space 901 will be generated relative to the movement of the depth sensing device. Black rectangles represent light fixtures 950A-N on the ceiling which can be distinguished by non-infrared reflective paint codes or infrared reactive phosphor codes. Although the generated map 900 is shown as black and white, a fully generated map is typically color coded, for example, yellow, orange, red, green, and blue, to represent varying distances between objects.

Figure 10:
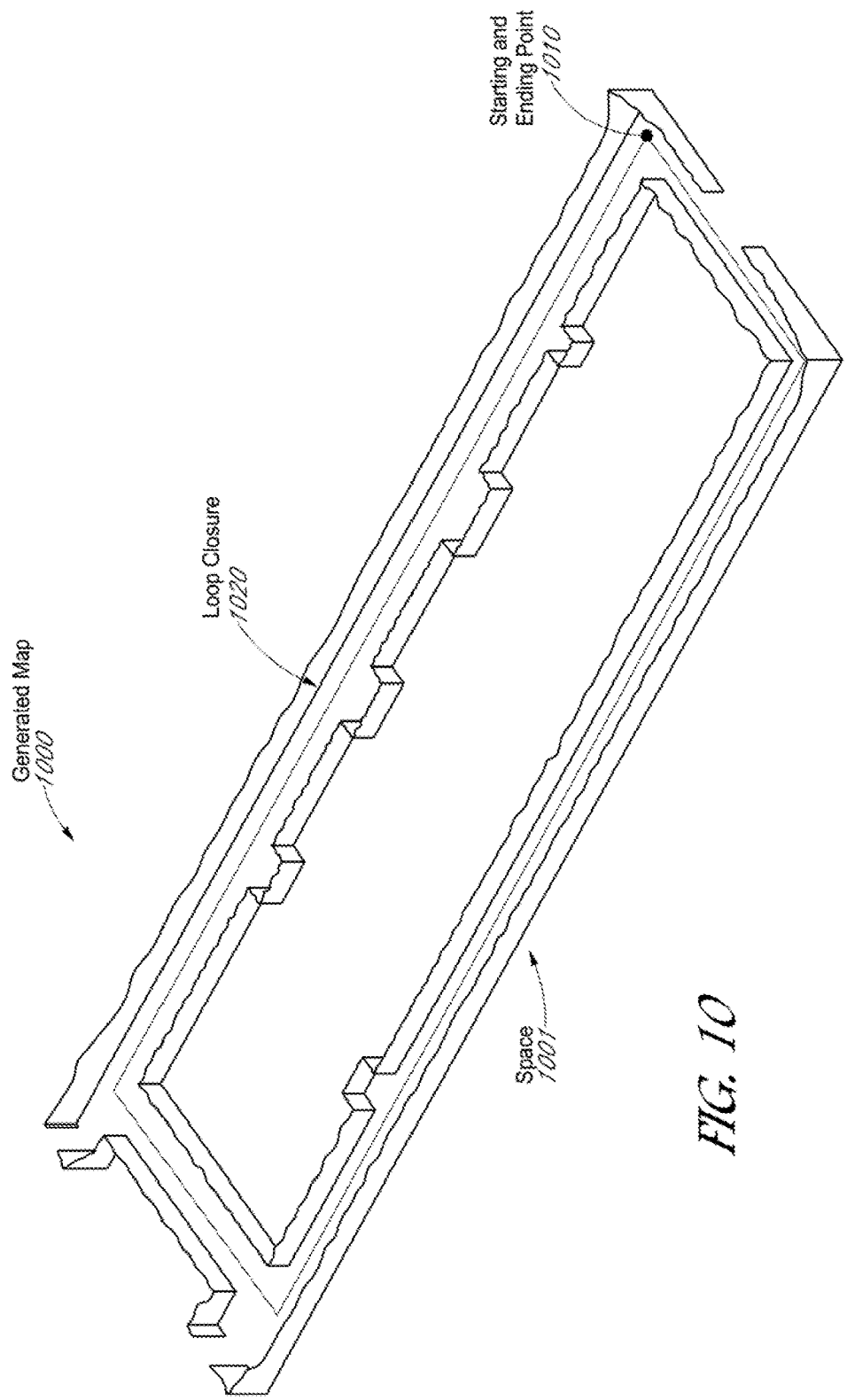
FIG. 10 depicts an example of a map generated by a simultaneous location and mapping (SLAM) algorithm utilizing a single-sided depth sensing device.

FIG. 10 depicts an example of a map generated by a simultaneous location and mapping (SLAM) algorithm utilizing a single-sided depth sensing device. As shown, the generated map 1000 includes a starting and ending point 1010 which is where scanning of the space 1001 begins and terminates. The single-sided depth sensing device moved around the space 1001 in a loop and there is loop closure 1020 once the loop is completed. A robust SLAM algorithm can generate the map 1000 accurate to the ground level along with loop closure 1020.

Figure 11:
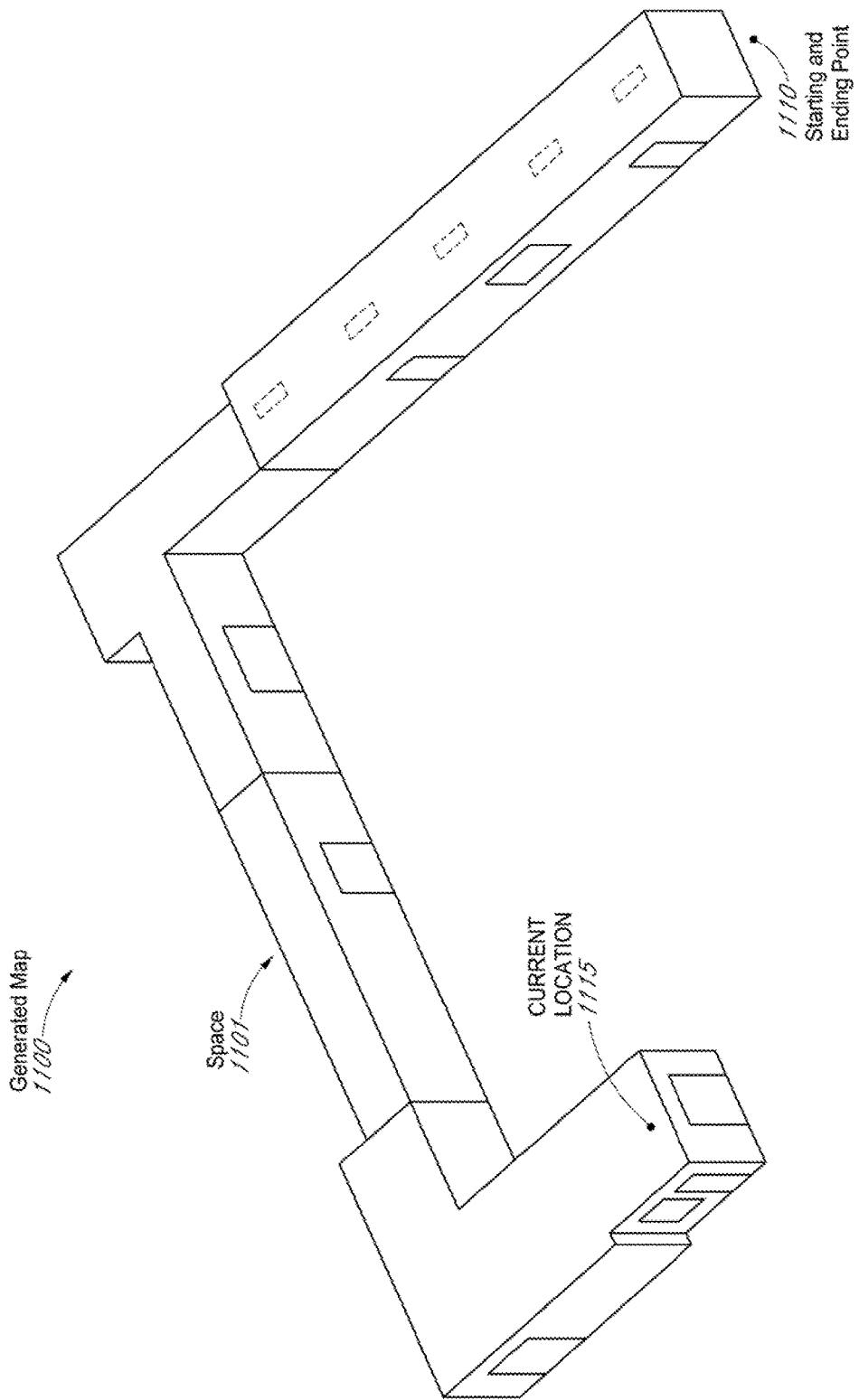
FIG. 11 depicts another example of a map generated by a simultaneous location and mapping (SLAM) algorithm utilizing a dual-sided depth sensing device.

FIG. 11 depicts another example of a map generated by a simultaneous location and mapping (SLAM) algorithm utilizing a dual-sided depth sensing device. As shown, the generated map 1100 includes a starting and ending point 1110 which is where scanning of the space 1101 begins and terminates. Currently, the dual-sided depth sensing device is at current location 1115. Hence, there generated map 1100 does not currently have loop closure. However, similar to a single-sided depth sensing device, the dual-sided depth sensing device will be moved around the space 1101 in a loop until there is eventually loop closure to complete the loop of scanning the various areas in the space 1101.

FIG. 12A depicts a simultaneous location and mapping (SLAM) algorithm generated map. FIG. 12B depicts a building floor plan corresponding to the space for which the SLAM generated map of FIG. 12A was generated.

As shown, the SLAM generated map 1200A includes local known object location coordinates 1260A for a known object whose location coordinates are known. In addition, the SLAM generated map 1200A includes local light fixture location coordinates 1265A for various light fixtures. However, in the example, the SLAM generated map 1200A is rotated by an angle with respect to the floor plan 1200B shown in FIG. 12B. However, it can be seen that the SLAM generated map 1200A maintains distinguishable features that match the floor plan 1200B in exactly one orientation. Hence, image transformation is utilized to overlay the SLAM generated map 1200A on top of the floor plan 1200B. Then the global light fixture location coordinates 1265B of the light fixtures can be obtained with respect to the global known object location coordinates 1260B for the known object based on the image transformation (i.e., the angle of rotation to make the overlay work).

FIGS. 13A-B illustrate infrared light patterns projected by an infrared projector of a depth sensor and infrared light captured by an infrared camera of the depth sensor. As shown in FIGS. 13A-B, projected infrared light 1305A-B is emitted by an infrared emitter, such as the infrared projector. The projected infrared light 1305A-B can be modulated at different rates per pixel, row, or column. The projected infrared light 1305A-B and portions thereof can also be staggered in timing or emitted all at once. Objects in a space, such as a respective object 1315A-B, cause distortions of the pattern in the projected infrared light 1305A-B, respectively. The distortions are captured by a respective infrared sensor, such as the infrared camera, as the captured infrared light 1310A-B, respectively. Typically, there is a light ray for each of the infrared dots hitting the respective infrared camera.

Of course, other storage devices or configurations may be added to or substituted for those in the examples of FIGS. 1-4 of the depth sensing devices and host/server computer. Such other storage devices may be implemented using any type of storage medium having computer or processor readable instructions or programming stored therein and may include, for example, any or all of the tangible memory of the computers, processors or the like, or associated modules.

Program aspects of the technology may be thought of as "products" or "articles of manufacture" typically in the form of executable code and/or associated data that is carried on or embodied in a type of machine readable medium. For example, programming code could include code for depth sensing in light fixture commissioning, image recognition and object detection algorithms, and SLAM algorithms. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the media gateway and client device. Thus, another type of media that may bear the programming, media content or meta-data files includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In general, the term "application," as used herein, refers to logic embodied in hardware or software instructions, which can be written in a programming language, such as Java™, C, C++, C#, for example. A software application can be compiled into executable programs or written in interpreted programming languages, such as Perl, Visual Basic script, HTML, or JavaScript. Software applications may be callable from other applications. Generally, applications described herein refer to logical modules that may be merged with other modules or divided into sub-module despite their physical organization. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
    a depth sensing device comprising a depth sensor, wherein the depth sensor includes:
        an infrared projector; and
        an infrared camera;
    a processor coupled to the depth sensor;
    a memory accessible to the processor; and
    programming in the memory, wherein execution of the programming by the processor configures the system to perform functions, including functions to:
        project, via the infrared projector, a pattern of infrared light on a plurality of objects located in a space that are reached by the projected infrared light, the plurality of objects including objects of interest and light fixtures in the space;

capture, via the infrared camera, distortions of the pattern in the projected infrared light on the plurality of objects;

uniquely identify each of the light fixtures in the space;

compute distance between the objects of interest and each of the uniquely identified light fixtures in the space based on the distortions, wherein the function to compute distance includes:

measuring distance between a first light fixture and a first known object of interest in the space for which location coordinates are known based on a distortion pattern on the first light fixture and the first known object of interest relative to the depth sensing device;

determine light fixture location coordinates for each of the light fixtures based on the computed distances between the objects of interest and each of the light fixtures, wherein the function to determine light fixture location coordinates includes:

correlating the light fixture location coordinates of the first light fixture based on the known location coordinates of the first known object of interest and the measured distance between the first light fixture and the first known object of interest; and build a map of the space that includes the determined light fixture location coordinates for each of the light fixtures.

2. The system, of claim 1, wherein execution of the programming by the processor further configures the system to uniquely identify each of the light fixtures in the space simultaneously with the infrared light being projected or captured.

3. The system of claim 2, wherein:
the function to uniquely identify each of the plurality of light fixtures in the space includes:
capturing, via the infrared camera, infrared light reflected off of each of the plurality of light fixtures; and
decoding the reflected infrared light of each respective one of the light fixtures into a respective quick response (QR) code that uniquely identifies the respective light fixture.

4. The system of claim 1, wherein:
the distortions of the pattern in the projected infrared light are captured by the infrared camera in a first field of view;
the depth sensing device further comprises: a second camera to capture one or more images including modulated visible light from at least one of the light fixtures in a second field of view;
the processor is coupled to the second camera; and
the function to uniquely identify each of the light fixtures in the space includes: demodulating the modulated visible light in the second field of view from the captured one or more images to identify a respective visible light communication (VLC) identifier of each of the light fixtures.

5. The system of claim 4, wherein the depth sensor and the second camera are operated simultaneously to allow the projecting and capturing of the infrared light to occur at a same time as unique identification of light fixtures.

6. The system of claim 1, wherein:
the depth sensing device further comprises: a network communication interface configured for wireless communication with the light fixtures over a wireless lighting commissioning network; and
the function to uniquely identify each of the light fixtures in the space includes: receiving, via the wireless communication interface, a respective light fixture identifier to uniquely identify a respective light fixture.

7. The system of claim 6, wherein the respective light fixture identifier to uniquely identify the respective light fixture is received simultaneously with the infrared light being projected or captured.

8. The system of claim 1, wherein:
the depth sensing device further comprises:
a touch screen located on a front-facing side of the depth sensing device; and
at least one of a red, green, and blue (RGB) camera or a black and white (BW) camera; and
the infrared projector and the infrared camera of the depth sensor are rear-facing relative to the touch screen located on the front-facing side of the depth sensing device.

9. The system of claim 8: wherein:
the depth sensing device further comprises a second depth sensor including a second infrared projector and a second infrared camera; and
the second infrared projector and the second infrared camera are front-facing.

10. The system of claim 9, wherein measuring distance between the first light fixture and the first known object of interest includes:
measuring an object of interest distance between the depth sensing device and the first known object of interest in the space for which location coordinates are known based on a first distortion pattern on the first object of interest captured by the rear-facing infrared camera of the depth sensor; and
measuring a light fixture distance between the first light fixture and the depth sensing device based on a second distortion pattern on the first light fixture captured by the front-facing infrared camera of the second depth sensor.

11. The system of claim 10, wherein:
the function to determine light fixture location coordinates for each of the light fixtures includes: correlating the light fixture location coordinates of the first light fixture based on the known coordinates of the first known object of interest, the light fixture distance, and the object of interest distance.

12. The system of claim 1, wherein:
the depth sensing device further comprises an accelerometer;
the processor is coupled to the accelerometer;
the execution of the programming by the processor configures the system to perform further functions to:
identify a known object of interest for which location coordinates are known; and
in response to identifying the known object of interest for which location coordinates are known, track, via an accelerometer, an object of interest distance between the known object of interest and a first light fixture; and
the function to determine light fixture location coordinates for each of the light fixtures includes: determining the light fixture location coordinates of the first light fixture further based on the known object of interest distance.

13. The system of claim 1, wherein:
the depth sensing device further comprises an accelerometer;

the processor is coupled to the accelerometer;
the execution of the programming by the processor configures the system to perform further functions to:
in response to uniquely identifying each light fixture in the space, repeat the functions to project, capture, and compute distance; and
track, via an accelerometer, a discovery distance between where a new light fixture is uniquely identified in the space and where a prior light fixture is uniquely identified in the space; and
the function to determine light fixture location coordinates for each of the light fixtures includes: determining the light fixture location coordinates further based on the discovery distance.

14. The system of claim 1, wherein:
the function to computing distance between the objects of interest and each of the light fixtures in the space based on the distortions of the pattern includes: measuring distance between each of the light fixtures and at least three objects of interest in the space for which location coordinates are known; and
the function to determine light fixture location coordinates for each of the light fixtures includes: trilaterating a respective light fixture relative to the at least three objects of interest.

15. The system of claim 1, wherein:
the depth sensing device further comprises at least one axis of rotation sensor;
the processor is coupled to the at least one axis of rotation sensor; and
the execution of the programming by the processor configures the system to perform functions to:
measure, via the at least one axis of rotation sensor, a device orientation angle of the depth sensing device as the infrared light is being projected or captured via the depth sensor on the objects of interest;
determine a light fixture orientation angle of each of the light fixtures as each of the light fixtures are being uniquely identified based on a light fixture type; and
calculate a relative orientation angle of each of the light fixtures relative to at least three objects of interest for which location coordinates are known by comparing the device orientation angle and the light fixture orientation angle; and
the function to determine light fixture location coordinates for each of the light fixtures includes: triangulating a respective light fixture relative to the at least three objects of interest.

16. The system of claim 15, wherein the at least one axis of rotation sensor includes at least one of:
a compass;
a magnetometer;
an accelerometer; or
a gyroscope.

17. The system of claim 1, wherein:
the depth sensing device further comprises:
a user interface located on a front side of the depth sensing device for displaying a graphical user interface (GUI) and to receive a user input to initiate scanning of the space;
the processor is coupled to the user interface; and
the execution of the programming by the processor configures the system to perform further functions to:
in response to receiving the user input to initiate scanning of the space, commence the functions to project, capture, uniquely identify each of the light fixtures, compute distance, determine light fixture location coordinates, and build the map of the space.

18. The system of claim 1, wherein the space is 3-dimensional and the light fixture location coordinates include 3 coordinates.

19. The system of claim 1, wherein:
the depth sensing device includes the processor, the memory, and the programming; and
the system further comprises a robot having a 360° range of motion to carry and operate the depth sensing device.

20. The system of claim 1, wherein:
the depth sensing device includes the processor, the memory, and the functions of the programming to project, capture, and uniquely identify each of the light fixtures;
the system further comprises:
a headset to carry and operate the depth sensing device; and
a host computer coupled to the depth sensing device via a network, the host computer including: a second processor, a second memory, and the functions of the programming to compute distance, determine light fixture location coordinates, and build the map of the space.

21. A system comprising:
a depth sensing device comprising a depth sensor, wherein the depth sensor includes:
an emitter; and
a detector;
a processor coupled to the depth sensor;
a memory accessible to the processor; and
programming in the memory, wherein execution of the programming by the processor configures the system to perform functions, including functions to:
emit, via the emitter, a pattern of electromagnetic waves on a plurality of objects located in a space that are reached by the emitted electromagnetic waves, the plurality of objects including objects of interest and light fixtures in the space;
capture, via the detector, distortions of the pattern in the electromagnetic waves on the plurality of objects;
uniquely identify each of the light fixtures in the space;
compute distance between the objects of interest and each of the uniquely identified light fixtures in the space based on the distortions, wherein the function to compute distance includes:
measuring distance between a first light fixture and a first known object of interest in the space for which location coordinates are known based on a distortion pattern on the first light fixture and the first known object of interest relative to the depth sensing device;
determine light fixture location coordinates for each of the light fixtures based on the computed distances between the objects of interest and each of the light fixtures, wherein the function to determine light fixture location coordinates includes:
correlating the light fixture location coordinates of the first light fixture based on the known location coordinates of the first known object of interest and the measured distance between the first light fixture and the first known object of interest; and
build a map of the space that includes the determined light fixture location coordinates for each of the light fixtures.

* * * * *